US010299223B2

United States Patent
Jha

(10) Patent No.: US 10,299,223 B2
(45) Date of Patent: May 21, 2019

(54) SYSTEM AND METHOD TO FACILITATE POWER DOMAIN INTERFERENCE COORDINATION IN A NETWORK ENVIRONMENT

(71) Applicant: CISCO TECHNOLOGY, INC., San Jose, CA (US)

(72) Inventor: Vivek Jha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 15/296,943

(22) Filed: Oct. 18, 2016

(65) Prior Publication Data

US 2018/0110017 A1    Apr. 19, 2018

(51) Int. Cl.
*H04W 4/00* (2018.01)
*H04W 52/30* (2009.01)
(Continued)

(52) U.S. Cl.
CPC .......... *H04W 52/30* (2013.01); *H04B 7/0452* (2013.01); *H04B 7/0456* (2013.01);
(Continued)

(58) Field of Classification Search
CPC ..................................................... H04W 52/30
See application file for complete search history.

(56) References Cited

U.S. PATENT DOCUMENTS

| 8,812,039 | B2 * | 8/2014 | Zhuang | H04B 7/024 455/114.2 |
| 8,849,336 | B2 * | 9/2014 | Carmon | H04W 52/143 455/522 |

(Continued)

FOREIGN PATENT DOCUMENTS

| WO | 2014014317 A1 | 1/2014 |
| WO | WO2015/157565 | 10/2015 |
| WO | WO2016/072687 | 5/2016 |

OTHER PUBLICATIONS

PCT Notification of Transmittal of the International Search Report and the Written Opinion of the International Searching Authority, or the Declaration for Application No. PCT/US2017/056151 dated Feb. 12, 2018.

(Continued)

*Primary Examiner* — Gerald A Smarth
(74) *Attorney, Agent, or Firm* — Patterson + Sheridan, LLP

(57) ABSTRACT

A method is provided in one example embodiment and may include negotiating power domain interference coordination (PDIC) parameters between a macro cell radio and at least one small cell radio; determining successive interference cancellation (SIC) parameters for each of one or more user equipment (UE) that are to perform SIC for one or more transmissions; and sending the SIC parameters to each of the one or more user equipment. Negotiating PDIC parameters can include determining, by the macro cell radio and at least one small cell radio, one or more physical resource blocks (PRBs) for which transmission power levels can be coordinated for a plurality of frequencies in a frequency domain and a plurality of subframes in a time domain and exchanging PDIC parameters between the cell radios in order to perform PDIC transmissions for UE served by the cell radios.

20 Claims, 8 Drawing Sheets

US 10,299,223 B2
Page 2

(51) Int. Cl.
*H04B 7/0452* (2017.01)
*H04B 7/0456* (2017.01)
*H04L 1/00* (2006.01)
*H04W 16/32* (2009.01)
*H04W 52/04* (2009.01)

(52) U.S. Cl.
CPC .......... *H04L 1/0005* (2013.01); *H04L 1/0011* (2013.01); *H04W 16/32* (2013.01); *H04W 52/04* (2013.01)

(56) References Cited

U.S. PATENT DOCUMENTS

| | | | | |
|---|---|---|---|---|
| 9,723,616 | B2* | 8/2017 | Cimpu | H04W 72/082 |
| 9,780,854 | B2* | 10/2017 | Karsi | H04B 7/0608 |
| 2014/0213315 | A1* | 7/2014 | Kim | H04W 52/325 455/522 |
| 2014/0233407 | A1 | 8/2014 | Pourahmadi et al. | |
| 2015/0031369 | A1* | 1/2015 | Gunnarsson | H04W 36/04 455/438 |
| 2015/0078216 | A1* | 3/2015 | Ribeiro | H04W 52/244 370/278 |
| 2015/0146657 | A1 | 5/2015 | Tsai et al. | |
| 2015/0326360 | A1* | 11/2015 | Malladi | H04L 5/0032 370/329 |
| 2016/0119807 | A1 | 4/2016 | Sun et al. | |
| 2016/0134314 | A1 | 5/2016 | Yang et al. | |
| 2016/0219529 | A1 | 7/2016 | Benjebbour et al. | |

OTHER PUBLICATIONS

"3GPP TS 36.300 V12.10.0 (Jun. 2016) Technical Specification: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP, 650 Route des Lucioles—Sophia Antipolis Valbonne—France; Jun. 2016, 254 pages.

"3GPP TS 36.300 V13.4.0 (Jun. 2016) Technical Specification: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP, 650 Route des Lucioles—Sophia Antipolis Valbonne—France; Jun. 2016, 310 pages.

"3GPP TS 36.321 V12.9.0 (Mar. 2016) Technical Specification: $3^{rd}$ Generation Partnership Project; Technical Specification Group Radio Access Network; Evolved Universal Terrestrial Radio Access (E-UTRA); Medium Access Control (MAC) protocol specification (Release 12)," 3GPP, 650 Route des Lucioles—Sophia Antipolis Valbonne—France, Mar. 2016; 77 pages.

"3GPP TS 36.321 V13.2.0 (Jun. 2016) Technical Specification: $3^{rd}$ Generation Partnership Project; Technical Specification Group Radio Access Network; Evolved Universal Terrestrial Radio Access (E-UTRA); Medium Access Control (MAC) protocol specification (Release 13)," 3GPP, 650 Route des Lucioles—Sophia Antipolis Valbonne—France, Jun. 2016; 91 pages.

Benjebbour, Anass, et al., "Concept and Practical Considerations of Non-orthogonal Multiple Access (NOMA) for Fugure Radio Access," 2013 IEEE $24^{th}$ Annual International Symposium on Personal, Indoor, and Mobile Radio Communications (PIMRC), Sep. 8-11, 2013.

Broadband Forum Technical Report, "TR-196, Femto Access Point Service Data Model," Issue: 2, Issue Date: Nov. 2011; 46 pages.
Broadband Forum Technical Report, "TR-069, CPE WAN Management Protocol," Issue: 1 Amendment 5, Issue Date: Nov. 2013, CWMP Version 1.4; 228 pages.
Capano, Daniel E., "Understanding modulation and coding schemes," Control Engineering, SI Global System Integrator Database, Dec. 19, 2014; 6 pages.
Ding, Zhiguo, et al., "Application of Non-orthogonal Multiple Access in LTE and 5G Networks," A Manuscript Submitted to the IEEE Communications Magazine, Nov. 30, 2015; 13 pages.
Duplicy, Jonathan, et al., "MU-MIMO in LTE Systems," EUASIP Journal on Wireless Communications and Networking, Published Mar. 14, 2011; 35 pages.
"Constellation diagram," from Wikipedia, the free encyclopedia, Jun. 30, 2016; 3 pages.
"MIMO in LTE Operation and Measurement—Exceprts on LTE Test, Application Note," Agilent Technologies, Inc., Jan. 25, 2010; 25 pages.
"MIMO," from Wikipedia, the free encyclopedia, Aug. 29, 2016; 13 pages.
"Precoding," from Wikipedia, the free encyclopedia, Apr. 30, 2015; 8 pages.
Saito, Yuya, et al., "Non-Orthogonal Multiples Access (NOMA) for Cellular Future Radio Access," Vehicular Technology Conference (VTC Spring), Jun. 2-5, 2013; 5 pages.
"Transmit diversity," from Wikipedia, the free encyclopedia, Aug. 24, 2015; 2 pages.
3GPP TS 36.213 V12.10.0 (Jun. 2016) Technical Specification: $3^{rd}$ Generation Partnership Project; Technical Specification Group Radio Access Network; Evolved Universal Terrestrial Radio Access (E-UTRA); Physical Layer Procedures (Release 12), 3GPP, 650 Route des Lucioles—Sophia Antipolis Valbonne—France, Jun. 2016; 160 pages.
3GPP TS 36.331 V12.10.0 (Jun. 2016) Technical Specification: $3^{rd}$ Generation Partnership Project; Technical Specification Group Radio Access Network; Evolved Uiversal Terrestrial Radio Access (E-UTRA); Radio Resource Control (RRC); Protocol specification (Release 12), 3GPP, 650 Route des Lucioles—Sophia Antipolis Valbonne—France; Jun. 2016, 442 pages.
3GPP TS 36.331 V13.2.0 (Jun. 2016) Technical Specification: $3^{rd}$ Generation Partnership Project; Technical Specification Group Radio Access Network; Evolved Universal Terrestrial Radio Access (E-UTRA); Radio Resource Control (RRC); Protocol specification (Release 13), 3GPP, 650 Route des Lucioles—Sophia Antipolis Valbonne—France, Jun. 2016, 623 pages.
3GPP TSG RAN WG1 meeting 81, No. R1-152493, "Candidate schemes for superposition transmission," Huawei, HiSilicon, Fuknoka, Japan, May 25-29, 2015; 11 pages.
3GPP TSG RAN WG1 Meeting #86, R1-167121, "Discussion on superposition transmission," Intel Corporation, Gothenburg, Sweden, Aug. 22-26, 2016; 3 pages.
ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12); ETSI, 650 Route des Lucioles—Sophia Antipolis Valbonne—France; Apr. 2015; 139 pages.
ETSI TS 136 214 V10.1.0 (Apr. 2011) Technical Specification: LTE; Evolved Universal Terrestrial Radio Access (E-UTRA); Physical Laker; Measurements (3GPP TS 36.214 version 10.1.0 Release 10), ETSI, 650 Route des Lucioles—Sophia Antipolis Valbonne—France; Apr. 2011; 15 pages.

\* cited by examiner

100

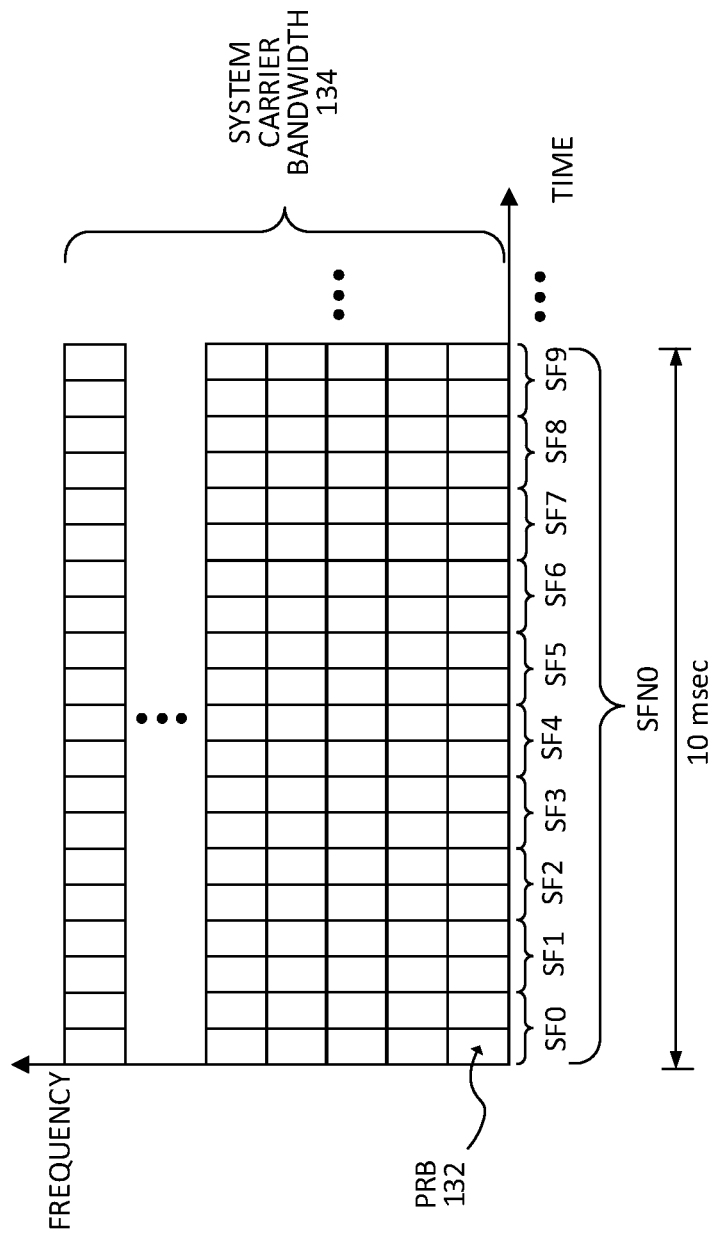

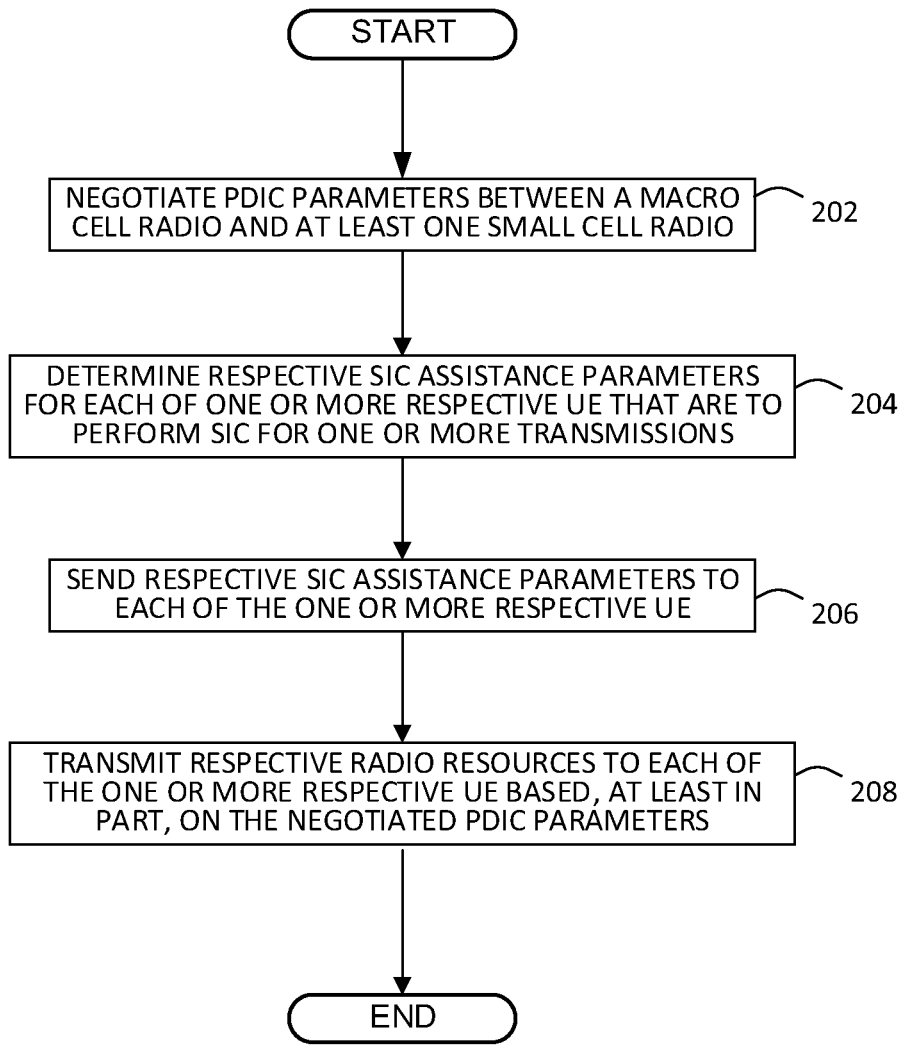

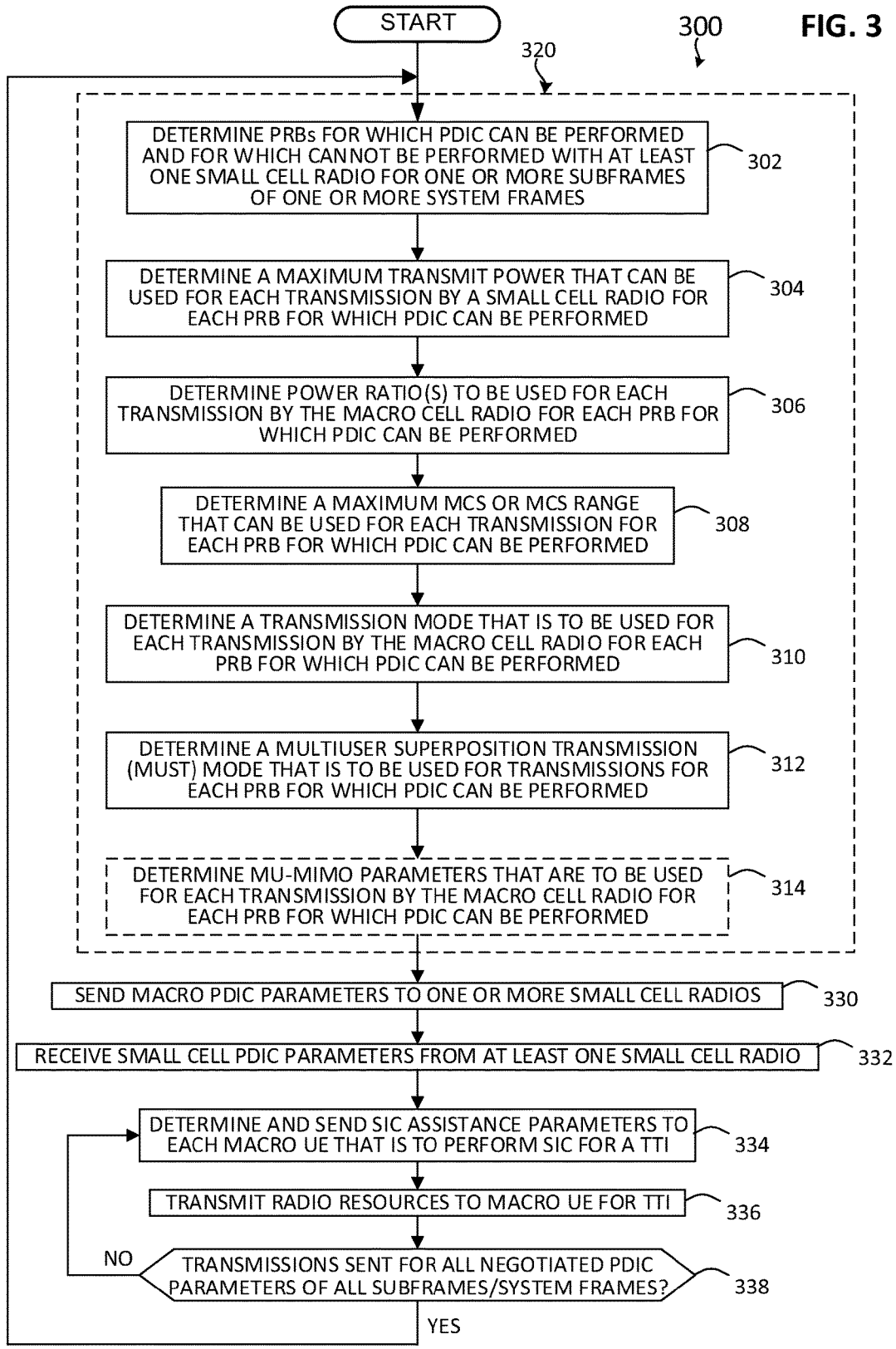

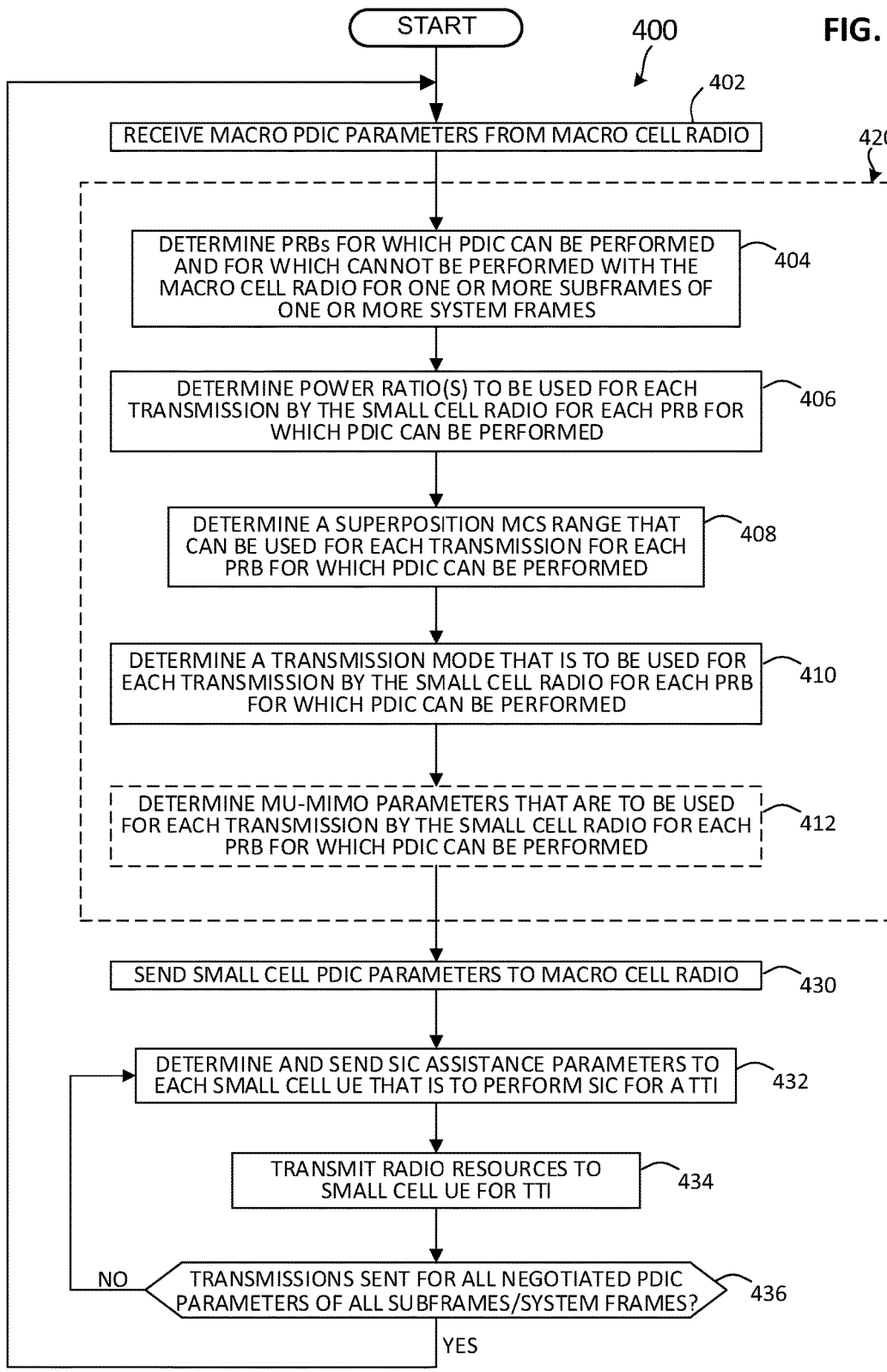

SYSTEM AND METHOD TO FACILITATE POWER DOMAIN INTERFERENCE COORDINATION IN A NETWORK ENVIRONMENT

TECHNICAL FIELD

This disclosure relates in general to the field of communications and, more particularly, to a system and method to facilitate power domain interference coordination (PDIC) in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. Downlink and uplink transmissions are typically scheduled for a subscriber's user equipment (UE) served by a particular cell radio. In general, power control for downlink and uplink transmissions varies depending on path loss between a UE and its serving cell radio. In some cases, downlink and uplink transmissions cause interference to other neighboring cell radios. In the case of a heterogeneous network (HetNet) in which small cell coverage areas can overlap with macro cell coverage areas, downlink and uplink transmissions by a given cell radio can cause interference among both neighboring macro cell radios and neighboring small cell radios. As the number of subscribers increases, the possibility of interference between neighboring cell radios also increases, which can lead to inefficient network and UE performance. Accordingly, there are significant challenges in power domain interference coordination in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1B is a simplified schematic diagram illustrating example details associated with an example time-frequency grid that can be associated with communications in accordance with one potential embodiment of the communication system;

FIG. 2 is a simplified flow diagram illustrating example operations that can be associated with providing power domain interference coordination in a network environment in accordance with one potential embodiment of the communication system;

FIG. 3 is a simplified flow diagram illustrating example operations that can be associated with providing power domain interference coordination via a macro cell radio in accordance with one potential embodiment of the communication system;

FIG. 4 is a simplified flow diagram illustrating example operations that can be associated with providing power domain interference coordination via a small cell radio in accordance with one potential embodiment of the communication system.

DETAILED DESCRIPTION OF EXAMPLE EMBODIMENTS

Overview

Figure 1A:
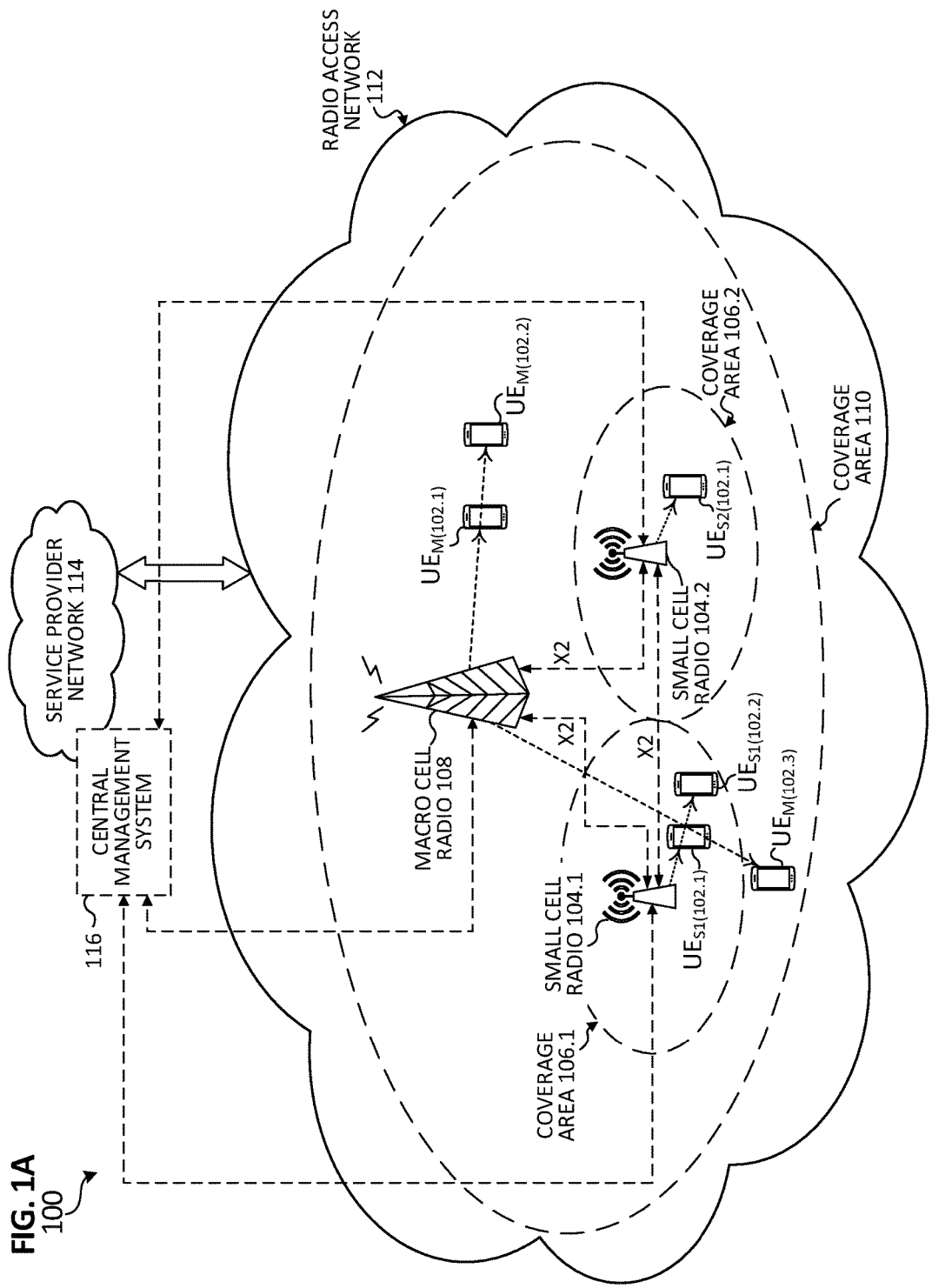
FIG. 1A is a simplified block diagram illustrating a communication system to facilitate power domain interference coordination in a network environment according to one embodiment of the present disclosure.

A method is provided in one example embodiment and may include negotiating power domain interference coordination (PDIC) parameters between a macro cell radio and at least one small cell radio, wherein the PDIC parameters comprise macro PDIC parameters for the macro cell radio and small cell PDIC parameters for the at least one small cell radio; determining successive interference cancellation (SIC) parameters for each of one or more user equipment (UE) that are to perform SIC for one or more transmissions; and sending the SIC parameters to each of the one or more user equipment. Negotiating PDIC parameters can include determining, by the macro cell radio, one or more physical resource blocks (PRBs) for which transmission power levels can be coordinated with the at least one small cell radio, wherein the determining is performed for a plurality of frequencies in a frequency domain and a plurality of subframes in a time domain; and determining, for the plurality of frequencies and the plurality of subframes, one or more PRBs for which transmission power levels cannot be coordinated with the one or more small cell radios.

The method can further include determining, by the macro cell radio: a maximum modulation and coding scheme (MCS) or an MCS range that can be used for each transmission by the macro cell radio for each of the one or more PRBs for which transmission power levels can be coordinated with the at least one small cell radio; a maximum transmit power that can be used for each transmission for each of the one or more PRBs for which transmission power levels can be coordinated with the at least one small cell radio; one or more power ratio(s) to be used for each transmission by the macro cell radio for each of the one or more PRBs for which transmission power levels can be coordinated with the at least one small cell radio; a transmission mode that is to be used by the macro cell radio for each transmission for each of the one or more PRBs for which transmission power levels can be coordinated with the at least one small cell radio; and a Multiuser Superposition Transmission (MUST) mode that can be used for the transmissions for each of the one or more PRBs for which transmission power levels can be coordinated with the at least one small cell radio.

The macro cell radio can send the macro PDIC parameters to the at least one small cell radios, wherein the macro PDIC parameters can include: an indication for each the one or more PRBs for which transmission power levels can be coordinated and for which transmission power levels cannot be coordinated with the at least one small cell radio; a MUST mode indicator; a macro transmission mode indicator that is to be used by the macro cell radio for each transmission for each of the one or more PRBs for which transmission power levels can be coordinated with the at least one small cell radio; the maximum MCS or MCS range that can be used for each transmission by the macro cell radio for each of the one or more PRBs for which transmission power levels can be coordinated with the at least one small cell radio; the maximum transmit power that can be used for each transmission for each of the one or more PRBs for which transmission power levels can be coordinated with the at least one small cell radio; and the one or more power ratio(s) to be used by the macro cell radio for each transmission for each of the one or more PRBs for which transmission power levels can be coordinated with the at least one small cell radio. In some cases, the macro cell radio can further determine one or more multiuser multiple-input multiple-output (MU-MIMO) parameters, wherein the one or more MU-MIMO parameters comprise at least one of: a number of superposition layers and a precoding matrix indicator. The macro cell radio can include the MU-MIMO parameters in the macro PDIC parameters sent to the at least one small cell radio. In various instances the MUST mode indicator can indicate one of: a Non-Orthogonal Multiple Access (NOMA) mode; a Semi-Orthogonal Multiple Access (SOMA) mode; and a Rate-adaptive constellation Expansion Multiple Access (REMA) mode.

The method can further include a small cell radio determining: one or more PRBs for which transmission power levels can be coordinated with the macro cell radio based, at least in part, on the macro PDIC parameters received from the macro cell radio for the plurality of frequencies and the plurality of subframes; one or more power ratio(s) to be used by the small cell radio for each transmission for each of the one or more PRBs for which transmission power levels can be coordinated with the macro cell radio; a superposition MCS range that is to be used by the small cell radio for each transmission for each of the one or more PRBs for which transmission power levels can be coordinated with the macro cell radio; and a transmission mode that is to be used by the small cell radio for each transmission for each of the one or more PRBs for which transmission power levels can be coordinated with the macro cell radio.

The small cell radio can send the small cell PDIC parameters to the macro cell radio, wherein the small cell PDIC parameters can include: an indication for each the one or more PRBs for which transmission power levels can be coordinated with the macro cell radio;

the one or more power ratio(s) to be used by the small cell radio for each transmission for each of the one or more PRBs for which transmission power levels can be coordinated with the macro cell radio; a small cell transmission mode indicator that is to be used by the small cell radio for each transmission for each of the one or more PRBs for which transmission power levels can be coordinated with the macro cell radio; and the superposition MCS range that can be used for each transmission by the small cell radio for each of the one or more PRBs for which transmission power levels can be coordinated with the macro cell radio. In some cases, the small cell radio can further determine MU-MIMO parameters, wherein the one or more MU-MIMO parameters comprise at least one of: a number of superposition layers and a precoding matrix indicator, and the small cell radio can include MU-MIMO parameters in the small cell PDIC parameters sent to the macro cell radio.

In various instances, SIC parameters sent to a particular UE can include: a superposition presence indication; a maximum transmit power indication; a power ratio indication associated with radio resources to be transmitted to the particular UE; a modulation and coding scheme (MCS) indication associated with the radio resources to be transmitted to the particular UE; an equivalent MCS due to superposition associated with the radio resources to be transmitted to the particular UE; and a transmission mode indicator associated with the radio resources to be transmitted to the particular UE. In some instances, the SIC parameters sent to the particular UE can further include one or more MU-MIMO parameters, wherein the one or more MU-MIMO parameters comprise at least one of: a number of superposition layers and a precoding matrix indicator associated with the radio resources to be transmitted to the particular UE.

Example Embodiments

Referring to FIG. 1A, FIG. 1A is a simplified block diagram illustrating a communication system 100 to facilitate power domain interference coordination (PDIC) in a network environment according to one embodiment of the present disclosure. This particular configuration may be tied to the 3rd Generation Partnership Project (3GPP) Evolved Packet System (EPS) architecture, sometimes referred to as the Long Term Evolution (LTE) EPS or 4th Generation (4G) architecture. Alternatively, the depicted architecture may be applicable to other environments equally such as, for example, a 3GPP 5th Generation (5G) network environment in at least one embodiment.

Figure 1C:
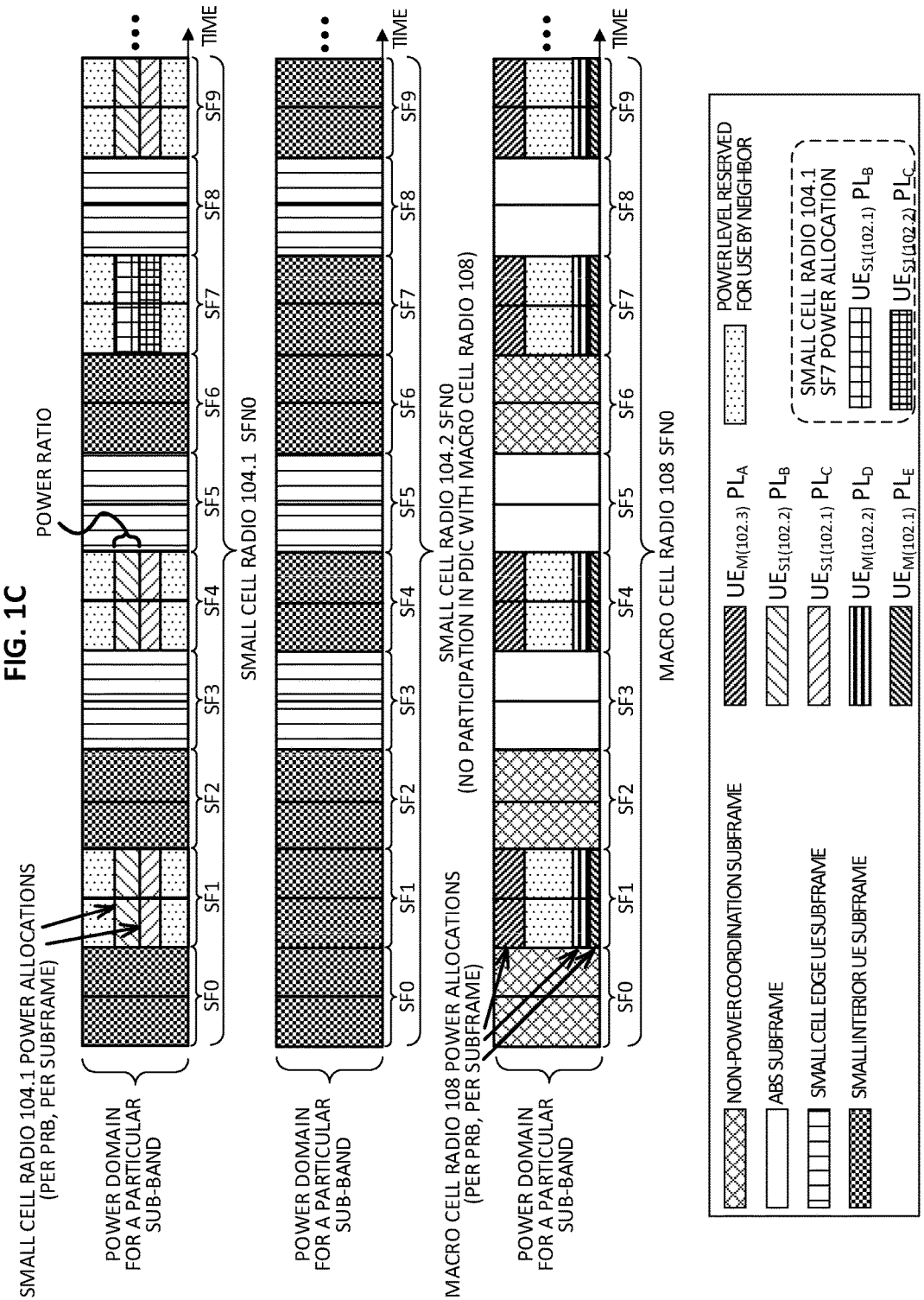
FIG. 1C is a simplified schematic diagram illustrating example details associated with providing power domain interference coordination for a number of subframes in accordance with one potential embodiment of the communication system.

The example architecture of FIG. 1A can include users operating user equipment (UE) such as $UE_{S1(102.1)}$-$UE_{S1(102.2)}$ served by a first small cell radio 104.1, $UE_{S2(102.1)}$ served by a second small cell radio 104.2 and $UE_{M(102.1)}$-$UE_{M(102.3)}$ served by a macro cell radio 108 within a Radio Access Network (RAN) 112, which provides a communication interface with a service provider network 114. First small cell radio 104.1 can provide a first coverage area 106.1 and second small cell radio 104.2 can provide a second coverage area 106.2. Macro cell radio 108 can provide a coverage area 110. FIGS. 1B-1C are example schematic diagram illustrating various example details that can be associated with communication system 100 and will be discussed in conjunction with FIG. 1A.

Each of the elements of FIG. 1A may couple to one another through simple interfaces or through any other suitable connection (wired or wireless), which provides a viable pathway for network communications. As referred to herein, a physical interconnection (wired or wireless) can refer to the interconnection of elements with each other, while a logical interconnection can refer to communications, interactions and/or operations of elements with each other in a network environment. Communications in a network environment are referred to herein as 'messages', 'messaging' and/or 'signaling', which may be inclusive of packets. Generally, signaling is referred to in reference to control-plane packets while messaging can be referred to in reference to control-plane or data-plane packets exchanged for communications at the application level.

Each respective UE shown in FIG. 1A can be logically connected to each respective cell radio serving the respective UE via one or more respective over-the-air (OTA) Radio Frequency (RF) communication link(s) within a coverage area of each respective cell radio as indicated by the respective dashed lines between each UE and its corresponding serving cell radio (e.g., $UE_{S1(102.1)}$-$UE_{S1(102.2)}$ served by small cell radio 104.1; $UE_{S2(102.1)}$ served by small cell radio 104.2; and $UE_{M(102.1)}$-$UE_{M(102.2)}$ served by macro cell radio 108). The OTA communication link between a UE and its serving cell radio is typically referred to as the Uu interface over which Radio Resource Control (RRC) can be provided for the UE.

Each of small cell radio 104.1-104.2 and macro cell radio 108 can be logically connected to each other through one or more wireless and/or wired interface(s). In at least one embodiment, the cell radios can be interconnected via one or more X2 interface(s) as defined by 3GPP standards. Each small cell radio 104.1-104.2 and macro cell radio 108 can have one or more logical connections with service provider network 114. In at least one embodiment, service provider network 114 can include a central management system 116 and each small cell radio 104.1-104.2 and macro cell radio 108 can be logically connected to the central management system 116 in addition to or in alternative to being interconnected via one or more X2 interface(s).

A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network (PDN). Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a service gateway interface (SGi), a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like.

In general, RAN 112 may provide a communications interface for non-3GPP and/or 3GPP access networks via one or more RAN nodes (e.g., small cell radios 104.1-104.2, macro cell radio 108), which may facilitate communications between UE within the RAN and service provider network 114. RAN 112 may provide one or more coverage areas (e.g., small cell coverage areas 106.1-106.2, macro cell coverage area 110) for servicing multiple end users and for managing their associated connectivity. The communications interface provided by RAN 112 may facilitate communication exchanges between an end user (e.g., the end user's UE) and any number of elements within communication system 100. For example, RAN 120 may facilitate the delivery of a request packet (e.g., request for service(s)) generated by a given UE and the reception of information sought by an end user associated with the UE.

In various embodiments, 3GPP access networks can include Global System for Mobile Communications (GSM) Enhanced Data Rates for GSM (EDGE) Radio Access Network (GERAN), Universal Mobile Telecommunication System (UMTS) Terrestrial Radio Access Network (UTRAN), generally referred to as 3rd Generation (3G), and/or a LTE access network such as Evolved-UTRAN (E-UTRAN), generally referred to as 4G, LTE/LTE-Advanced (LTE-A) and/or 5G 3GPP access networks. In various embodiments, non-3GPP access networks can include wireless local area networks (WLANs), such as Institute of Electrical and Electronic Engineers (IEEE) 802.11 networks, Worldwide Interoperability for Microwave Access (WiMAX) networks, Bluetooth™ networks, combinations thereof or the like.

In various embodiments, the macro cell radio coverage area for a given macro cell radio (e.g., macro cell radio 108) can overlap, in whole or in part, small cell radio coverage areas for one or more small cell radios (e.g., respective coverage areas for respective small cell radios 104.1-104.2). It should be understood that the coverage areas shown in FIG. 1A are provided for illustrative purposes only and are not meant to limit the broad scope of the teachings of the present disclosure. Any other coverage areas (e.g., coverage area size and/or range) can be provided by cell radios within the scope of the present disclosure. Further the number of UE and the number of small cell and macro cell radios shown in FIG. 1A are provided for illustrative purposes only and are not meant to limit the road scope of the teachings of the present disclosure. In various embodiments, communication system 100 can be configured to support hundreds or thousands of UE through the deployment of multiple macro cell radios and multiple small cell radios as desired by a network operator and/or service provider. RAN 112 is only one example of a communications interface between an end user and service provider network 114. Other suitable types of communications interfaces may be used for any appropriate network design and, further, may be based on specific communications architectures in accordance with particular needs In general, service provider network 114 represents a series of points or nodes of interconnected communication paths for receiving and transmitting packets of information that may propagate through communication system 100. In various embodiments, service provider network 114 can be configured according to 3GPP standards to include one or more elements of an Evolved Packet Core (EPC), a packet-switched (PS) architecture and/or a circuit-switched (CS) architecture as prescribed by 3GPP standards in order to provide services (e.g., voice, data, multimedia, etc.) and interconnectivity for $UE_{S1(102.1)}$-$UE_{S1(102.2)}$, $UE_{S2(102.1)}$ and/or $UE_{M(102.1}$-$UE_{M(102.3)}$ to one or more packet data networks (e.g., the Internet).

In various embodiments, macro cell radio 108 can be deployed as an evolved Node B (eNodeB or eNB), which can provide cellular/mobile coverage for a 4G/LTE/LTE-A macro cell access network, or a Node B (NodeB), which can provide cellular/mobile coverage for a 2G/3G macro cell access network. In still other embodiments, macro cell radio 108 can be deployed as a 5G RAN node, which can provide cellular/mobile coverage for a 5G macro cell access network. In general a NodeB is deployed in conjunction with a Radio Network Controller (RNC), which may provide radio control for the NodeB. In at least one embodiment, macro cell radio 108 can include one or transmitters and/or receivers (e.g., transceivers) and one or more antenna(s) to facilitate over the air communications with one or more UE served thereby.

In addition to other operations discussed herein, macro cell radio 108 can, in various embodiments, be responsible for selecting a Mobility Management Entity (MME) or a Serving General Packet Radio Service (GPRS) Support Node (SGSN) within service provider network 114 for session establishment for each UE served by macro cell radio 108 (e.g., $UE_{M(102.1)}$-$UE_{M(102.3)}$), for managing radio resources for such UE, and making handover decisions for such UE, for example, handover to other cell radios (e.g., to other macro and/or small cell radios).

In various embodiments, one or more of small cell radios 104.1-104.2 can be deployed as home evolved NodeBs (HeNBs), which can provide cellular/mobile coverage for a 4G/LTE/LTE-A small cell access network, and/or can be deployed has Home Node Bs (HNBs), which can provide cellular/mobile coverage for a 2G/3G small cell access network. In still other embodiments, one or more of small cell radios can be deployed as a 5G RAN node, which can provide cellular/mobile coverage for a 5G small cell access network. In some embodiments, small cell radios 104.1-104.2 can be deployed as 'single-stack' devices offering 5G, 4G/LTE/LTE-A or 2G/3G connectivity, 'dual-stack' devices offering 5G, 4G/LTE/LTE-A or 2G/3G connectivity and Wi-Fi/WiMAX connectivity, or 'multi-stack' offering any combination of 5G connectivity, 4G/LTE connectivity, 2G/3G connectivity and/or Wi-Fi/WiMAX connectivity.

Typically, small cell radios operate at lower power levels as compared to macro cell radios to provide services to proximate users, for example, within in a business or residential environment (e.g., within a building, home, etc.). In some embodiments, small cell radios (e.g., small cell radios 104.1-104.2) can be deployed in business (e.g., enterprise) environments within predefined clusters, grids or groups that can be optimized to provide contiguous or overlapping cellular/mobile coverage for enterprise users (e.g., employees, visitors, etc.) when such users are located within a coverage area of small cell radios deployed in such a cluster/grid. In some embodiments, small cell radios can be deployed in residential or densely populate environments to provide cellular/wireless connectivity in areas where macro cell radio coverage area(s) may be limited and/or overloaded.

In some embodiments, small cell radios 104.1-104.2 can interface with service provider network 114 via one or more small cell gateways (not shown), which can be used to aggregate and/or manage sessions for UE connected to the small cell network. Small cell radios can be connected using a standard broadband digital subscriber line (DSL), internet or cable service into service provider network 114 via the one or more small cell gateways. Calls can be made and received, where the signals are sent (potentially encrypted) from a given small cell radio via a broadband Internet protocol (IP) network to one of the service provider's main switching centers. In some embodiments, small cell radios 104.1-104.2 can also interface with a small cell management system (not shown), which can be used to manage configurations (e.g., communication protocols, data models, etc.) for small cell radios 104.1-104.2. In some embodiments, a small cell management system can be included within central management system 116 or can be provided separate from the central management system. In at least one embodiment, each small cell radio 104.1-104.2 can include one or transmitters and/or receivers (e.g., transceivers) and one or more antenna(s) to facilitate over the air communications with one or more UE served thereby.

As referred to herein in this Specification, a 'small cell radio' (e.g., small cell radio 104.1, 104.2) can be referred to interchangeably as a 'small cell', a 'femtocell' or a 'pico cell'. As referred to herein in this Specification, a 'macro cell radio' (e.g., macro cell radio 108) can be referred to interchangeably as a 'macro cell', a 'macro radio' or a 'macro'.

In various embodiments, central management system 116 can be deployed as any central management element or system, such as, for example, an Operations, Administration and Maintenance (OAM) element, a Radio Management System (RMS), a Radio Resource Manager (RRM), a Self-Organizing Network (SON) management system, combinations thereof or the like. In certain embodiments, an RMS can be used in conjunction with small cell deployments, for example, to configure small cell radios 104.1-104.2 according to a particular communications protocol (e.g., technical report (TR) 069) and data model (e.g., TR-196 version 2).

In some embodiments, a SON management system and/or OAM element can have visibility of, and/or may interface with one or more parallel networks such as, for example, a macro cell access network, a small cell access network and/or a wireless local area network (WLAN), etc. and can be used to configure cell radios, coordinate downlink and/or uplink power control and/or coordinate resource management for UE associated with small cell and/or macro cell radios for a given deployment. In at least one embodiment, a SON management system or OAM element (e.g., central management system 116, depending on configuration) may provide a system-wide view of communication system 100. Accordingly, central management system 116 can, in various embodiments, be configured to interface with any element or node of communication system 100 via one or more logical interfaces. In various embodiments, central management system 116 can be deployed within service provider network 114, within cloud-based service (e.g., in a centralized SON (cSON) architecture) and/or can be deployed in a service network for a particular deployment, such as, for example, in an enterprise small cell deployment.

Generally, Signal-to-Interference-plus-Noise Ratio (SINR) is used to describe or quantify signal quality for downlink transmissions to UE (e.g., from a given serving cell radio to a given UE served by the cell radio) and/or uplink transmissions from UE (e.g., from a given UE to its given serving cell radio). In some embodiments, SINR for a given UE (e.g., any of $UE_{S1(102.1)}$-$UE_{S1(102.2)}$, $UE_{S1(102.2)}$, $UE_{S2(102.1)}$ and/or $UE_{M(102.1)}$-$UE_{M(102.3)}$) can be determined or estimated based on one or more of: a Reference Signal Received Quality (RSRQ) as measured by the UE for the Evolved-Universal Terrestrial Radio Access (E-UTRA); a downlink channel quality indicator (CQI) reported by the UE, relative Reference Signal Received Power (RSRP) and/or the received signal strength for an uplink transmission divided by the total interference in the cell. Typically, E-UTRA is described in reference to the air-interface for LTE radio access. In some embodiments, an expected or target SINR can be used in communication system 100 in order to determine and/or control PDIC, as discussed in further detail herein.

As defined in 3GPP Technical Specification (TS) 36.214, RSRP is the linear average over the power contributions of resource elements for physical resource blocks (PRBs) that carry cell-specific reference signals (CRS) within a considered measurement frequency bandwidth. RSRQ is defined as the ratio of the number (N) of PRBs of the E-UTRA carrier received signal strength indicator (RSSI) measurement bandwidth (e.g., system bandwidth) multiplied by the RSRP divided by the RSSI, generally expressed as 'N*RSRP/RSSI'. In general, a given UE can measure/determine signal strength information such as, for example, RSRP and/or RSRQ for a serving cell and/or non-serving cells (e.g., neighboring cells), if enabled. In certain embodiments, RSRP and/or RSRQ measurements for neighboring cells can be enabled for $UE_{S1(102.1)}$-$UE_{S1(102.2)}$, $UE_{S2(102.1)}$ and/or $UE_{M(102.1)}$-$UE_{M(102.3)}$. As used herein the terms 'relative RSRP' and 'relative interference' can be used interchangeably and can refer to a serving cell RSRP as measured by a given UE subtracted from a neighboring cell's RSRP as measured by the UE.

It should be noted that any UE signal strength information can be used among various embodiments described within the scope of the present disclosure for determining and/or controlling PDIC in a network environment. In at least one embodiment, for example, for a 3G deployment, signal strength information can include Common Pilot Channel (CPICH) energy per chip to total PSD at the UE antenna (Ec/Io) and/or CPICH Received Signal Code Power (RSCP) as defined in 3GPP standards. In another embodiment, for example, for a Wi-Fi deployment, signal strength information can include Received Signal Strength Indicator (RSSI), Received Channel Power Indicator (RCPI), combinations thereof, or other similar signal strength information. Accordingly, although many of the example embodiments discussed herein are described with reference to RSRP and/or RSRQ signal strength information, it should be understood that signal strength information as discussed for the various embodiments described herein can cover a multitude of access network types including both 3GPP and non-3GPP access networks.

In certain embodiments, downlink channel quality indicator (CQI) reported by a UE can be used to determine downlink SINR by using the CQI reported for a given UE as a proxy for determining downlink SINR. Generally, the CQI reported by a UE may be used to determine the Modulation and Coding Scheme (MCS) at which the cell radio to which the UE is connected needs to transmit packets to the UE such that the UE will receive packets at not more than a 10% Block Error Rate (BLER). If an Average White Gaussian Noise (AWGN) channel is assumed for the UE, an SINR can be determined that will lead to a 10% BLER based on the MCS chosen by the cell radio for downlink transmissions to the UE via the Physical Downlink Shared Channel (PDSCH), which carries data transport blocks (e.g., containing PRBs) to the UE. Generally, each MCS from which the cell radio can choose for downlink and/or uplink transmissions can be mapped to one or more SINR values or a range of SINR values, thereby enabling SINR determinations using the MCS chosen for downlink and/or uplink transmissions. Although UE manufacturers often implement different receivers, etc. for their equipment, which can lead to non-one-to-one MCS to SINR mappings, CQI can be used to determine an approximate SINR for a given UE based on the assumption that, as SINR increases for a UE, CQI can also increase because the UE can decode higher order modulation schemes while staying within the 10% BLER threshold.

Under an assumption of approximate uplink and downlink symmetry for a given UE, uplink or downlink SINR can be used for various embodiments described herein. As provided by 3GPP standards (e.g., TS 36.211), MCS for downlink or uplink UE transmissions can include, but not be limited to, Quadrature Phase Shift Keying (QPSK) and Quadrature Amplitude Modulation (QAM) including 16QAM, 64QAM and 256QAM with modulation order increasing from QPSK to 256QAM. The coding scheme or rate is typically set based on the modulation type selected for transmissions.

As illustrated FIG. 1A, $UE_{S1(102.1)}$-$UE_{S1(102.2)}$ may be located within the coverage area of small cell radio 104.1, which may be the serving or source cell radio for $UE_{S1(102.1)}$-$UE_{S1(102.2)}$. In at least one embodiment, $UE_{S1(102.1)}$ may be determined by small cell radio 104.1 to be a cell interior UE within the coverage area 106.1 of small cell radio 104.1 and $UE_{S1(102.2)}$ may be determined to be a cell edge UE within the coverage area 106.1 of small cell radio 104.1. $UE_{S2(102.1)}$ may be located within the coverage area of small cell radio 104.1, which may be the serving or source cell radio for $UE_{S2(102.1)}$. In at least one embodiment, $UE_{S2(102.1)}$ may be determined by small cell radio 104.2 to be a cell edge UE within the coverage area 106.2 of small cell radio 104.2. It should be understood, however, that the location of $UE_{S1(102.1)}$-$UE_{S1(102.2)}$, $UE_{S2(102.1)}$ in relation to the coverage areas of small cell radio 104.1-104.2 is provided for illustrative purposes only and is not meant to limit the broad scope of the present disclosure. It should be understood that UEs can be distributed anywhere within the coverage areas of small cell radios 104.1-104.2 within the scope of the teachings of the present disclosure.

In some embodiments, classifications of whether a given UE is a cell edge UE or a cell interior UE can be performed by a given cell radio serving the UE by determining the received power for an uplink signal received from a given UE divided by the interference in the cell in comparison to an expected or target SINR threshold (referred to herein as 'Target_SINR$_{CELL\_EDGE}$') that can be set to classify UE as cell edge UE. The expected or target SINR threshold can be set or updated by a network operator or service provider for a given deployment.

In some embodiments, the determination of whether a given UE is to be classified as a cell edge UE can include dividing the RSRP of the serving cell as measured by the UE (referred to herein as 'serving_cell_RSRP') by a quantity including the uplink RSSI for the UE (referred to herein as 'UE_uplink_RSSI') minus the serving_cell_RSRP and comparing the result to the Target_SINR$_{CELL\_EDGE}$ threshold. For example, if (serving_cell_RSRP)/(UE_uplink_RSSI-serving_cell_RSRP)<Target_SINR, then a given UE may be classified as a cell edge UE. In various embodiments, Target_SINR$_{CELL\_EDGE}$ can be varied in a range from approximately 5 decibel (dB) to approximately 10 dB, depending on expected interference and/or path loss for a small cell radio deployment under an assumption of at least two neighboring small cell radios and/or any empirical data that may be available to a given cell radio.

In some embodiments, determination of whether a given UE is to be classified as a cell interior UE can be performed by a given serving cell radio using a similar comparison in relation to an expected or target SINR threshold (target_SINR$_{CELL\_INT}$) that can be set to classify UE as cell interior UE. For example, if (serving_cell_RSRP)/(UE_uplink_RSSI-serving_cell_RSRP)>target_SINR$_{CELL\_INT}$, then a given UE may be a cell interior UE. In various embodiments, target_SINR$_{CELL\_INT}$ can be varied in a range from approximately 10 dB to approximately 15 dB, depending on expected interference and/or path loss for a small cell radio deployment and/or any empirical data available that may be available to a given cell radio.

In various embodiments, cell edge UE or cell interior UE classifications can be facilitated using other information including, but not limited to, using one or more of: a CQI reported by a UE for downlink communications and/or a RSRQ as measured by the UE and performing CQI and/or RSRQ comparisons to a predetermined threshold.

In at least one embodiment, each of small cell radio 104.1-104.2 and macro cell radio 108 may manage scheduling and power control of radio resources used in downlink and/or uplink transmissions for each corresponding UE that the may be served by each cell radio. Downlink radio resources may be those resources transmitted over an air interface to a particular UE (e.g., using one or more combinations of transmitters and/or antenna(s)) from its serving cell radio (e.g., using one or more combinations of receivers and/or antenna(s)). Uplink radio resources may be those resources transmitted over an air interface from a particular UE (e.g., using one or more combinations of transmitters and/or antenna(s)) to its serving cell radio (e.g., using one or more combinations of receivers and/or antenna(s)).

In some embodiments, LTE and 5G architectures can support multiuser (MU) access using Orthogonal Frequency-Division Multiple Access (OFDMA), which is a multiuser version of the orthogonal frequency-division multiplexing (OFDM) digital modulation scheme. Multiple accesses are achieved in OFDMA by assigning subsets of subcarriers to individual users. As referred to herein, subsets of subcarriers can be referred to as sub-bands. OFDMA allows for simultaneous transmissions from several users served by a particular cell radio. In certain embodiments, LTE architectures can also support multiuser access using Single Carrier Frequency Division Multiple Access (SC-FDMA), which is similar to OFDMA, but includes additional precoding.

In still some embodiments, LTE and 5G architectures can support MU access using Multiuser Superposition Transmission (MUST) techniques that can provide for the ability to provide multiuser access at a same time and frequency allocation but at different power levels, which can allow for gains to be realized in spectral efficiency and/or throughput over OFDMA deployments. Generally, MUST enables the use of a linear superposition coding scheme by scheduling transmissions for multiple UEs using different power level allocations while using the same precoding vectors and matrices. For example, PRBs for at least two UEs that each including a same number of resource elements of a same sub-band, subframe and system frame can be superposed in the power domain in a manner such that each UE can decode their respective codeword by cancelling different power level signals that do not include their respective codeword using a technique referred to as Successive Interference Cancellation (SIC). In various embodiments, MUST can be implemented according to various modes including, but not limited to: Non-Orthogonal Multiple Access (NOMA), Semi-Orthogonal Multiple Access (SOMA) and Rate-adaptive constellation Expansion Multiple Access (REMA). In general, a MUST deployment can include one or more power allocation policies, from which PDIC parameters can be coordinated among multiple cell radios for the deployment.

In at least one embodiment as described herein, MUST capable cell radios can determine SIC assistance parameters for each UE served thereby based, at least in part, on PDIC parameters coordinated between the cell radios, and can communicate the SIC assistance parameters to each UE. MUST capable UE can perform successive interference cancellations on downlink transmissions, which can be received both from their serving cell radio and neighboring cell radios, in order to cancel out higher power level transmissions meant for other UE. By successively cancelling out higher power level transmissions meant for other UE, a particular UE can demodulate and decode corresponding transmissions meant for it into resources sent from its serving cell radio. In the uplink, a MUST capable cell radio can perform SIC on transmissions received from UE served thereby to decode uplink radio resources sent from the UE. Uplink transmissions from UE can be sent using the Physical Uplink Shared Channel (PUSCH) maintained between a given serving cell radio and UE served thereby.

In the NOMA mode, a MUST capable transmitter (e.g., cell radio for downlink transmissions) can perform an amplitude-weighted superposition of coded and modulated signals such that transmissions for different UEs can be independently encoded, multiplexed together and then mapped onto modulation symbols for a given NOMA superposed constellation, which can be based on a given MCS selected for the transmissions. In general, a 'constellation' can refer to an in-phase (I) and quadrature (Q) mapping of symbols in an X-Y plane. In the SOMA mode, a MUST capable transmitter can perform an amplitude-weighted superposition of coded and modulated signals using Gray labeled superposed constellations such that transmissions for different UEs can be independently encoded, multiplexed together and then mapped onto modulation symbols for a given SOMA superposed constellation, which can be based on a given MCS selected for the transmissions. In the REMA mode, a MUST capable transmitter can perform a codeword-level superposition for a given modulation type such that transmissions for different UEs can be independently encoded, multiplexed together and then mapped onto modulation symbols of a conventional M-QAM constellation.

In some embodiments, multiple-input multiple-output (MIMO) technologies can be combined with MUST to provide further improvements in spectral efficiency and/or throughput for a multiple access deployment. Generally, MIMO refers to a type of communications in which signals can be transmitted from multiple sources (e.g., multiple antennas) and/or received via one or multiple antennas and/or receivers. During operation, in one embodiment, multiple signals containing the same information can be modulated and transmitted having different transmit characteristics (e.g., delayed versions, varying power, using different transmit diversity schemes, etc.). In a single-user MIMO (SU-MIMO) deployment, a cell radio having one multi-antennae transmitter can be used to communicate with a UE having one multi-antennae receiver. In a multiuser MIMO (MU-MIMO) deployment, multiple cell radios and multiple UEs, each having multi-antenna transmitters and multi-antenna receivers can perform transmissions of multiple data streams, typically referred to as MIMO layers, having spatial separation in the time and frequency spatial domains. Each spatial data stream or layer can be mapped to a different antenna port. In some embodiments, MU-MIMO can be combined with MUST where certain layers are superposed in the power domain.

Generally in LTE architectures, a given serving cell radio (e.g., small cell radio 104.1) can schedule downlink transmissions for a given UE (e.g., UE) by scheduling PRBs, generally referred to as RBs, that are to be transmitted to the UE over the PDSCH maintained between the UE and the serving cell radio. Uplink transmissions for the UE can also be scheduled by the serving cell radio. Control information (e.g., SIC assistance parameters) can be transmitted to the UE over a physical downlink control channel (PDCCH) maintained between the UE and the serving cell radio. In addition to other information discussed for various embodiments described herein, the PDCCH can be used to communicate information related to information downlink (DL) grant(s) for scheduled DL transmissions, uplink (UL) grant(s) for scheduled UL transmissions, power control, system configuration, random access, paging, etc. for UE.

A PRB, as defined in 3GPP technical specification (TS) 36.211, is typically represented by a number of resource elements spread across a number of symbols in the time domain and across a number of subcarriers in the frequency domain. Each resource element of a PRB can represent one symbol by one subcarrier. PRBs can be used to communicate data and control information between a cell radio and UE served thereby for both downlink and uplink transmissions. In Frequency Domain Duplexing (FDD), a subframe can include PRBs containing PDCCH, PDSCH and/or PUSCH information. In the frequency domain for LTE communications, the number of subcarriers for each of a PRB is typically twelve (12) at a subcarrier bandwidth of 15 kilohertz (kHz). Thus, each PRB typically spans a 180 kHz sub-band of system carrier bandwidth. In the time domain, each of a PRB can include a number of symbols spanning a respective 0.5 millisecond (msec) slot of a 1 msec subframe (SF). There are ten one (1) msec subframes in a ten (10) msec System Frame. In various embodiments, the number of symbols per PRB can depend on the cyclic prefix (CP) type for transmissions (e.g., seven (7) symbols for normal cyclic prefix or six (6) symbols for symbols for extended cyclic prefix). Thus, for normal CP, the number of resource elements per PRB can be equal to 84 resource elements (e.g., 12 subcarriers×7 symbols=84 resource elements).

Referring to FIG. 1B, FIG. 1B is a simplified schematic diagram illustrating an example time-frequency grid 130 for a number of physical resource blocks (PRBs) 132 that can be used for communications in accordance with one potential embodiment of communication system 100. In the frequency domain, PRBs 132 can be spread across a number of subcarriers of a given system carrier bandwidth 134. In the time domain, PRBs 132 can span a number of subframes (e.g., SF0-SF9) for a number of system frames (e.g., System Frame Number 0 (SFN0)) in which each system frame can span 10 msec. It should be understood that the number of subframes and system frames can extend across time during operation.

System bandwidth can vary for different architectures and deployments. For LTE technologies, for example, system bandwidth can be varied between 1.4 megahertz (MHz) and 20 MHz and the number of available PRBs that can be scheduled or allocated across UEs served by a given cell radio can change, respectively, between 6 and 100 PRBs per Transmission Time Interval (TTI) for transport block containing PRBs. Typically, a 10 MHz system carrier bandwidth corresponds to 50 available PRBs that can be allocated across UEs served by a particular cell radio for a particular TTI (e.g., there can be 100 available PRBs for allocation per 1 msec subframe, 50 for each slot). In general, each UE served by a given cell radio can be allocated a number of the PRBs in the time-frequency grid for various subframes/system frames. Generally, the more PRBs that a UE is allocated and the higher the modulation order that is used in transmitting the PRBs results in a higher achievable bit-rate or throughput rate for the UE. Which PRBs and how many PRBs each UE is allocated at a given point in time can depend upon frequency, time and/or power scheduling mechanisms for the cellular network. As referred to herein in this Specification, PRBs can be generally referred to as 'resources' or 'radio resources'.

Before detailing some of the operational aspects of FIG. 1A, it is important to understand common characteristics of interference coordination that can be provided in mobile communication networks. The following foundation is offered earnestly for teaching purposes only and, therefore should not be construed in any way to limit the broad teachings of the present disclosure.

In HetNet deployments (e.g., macro-pico deployments) downlink and/or uplink transmissions among small cell radios and macro cell radios can cause interference towards each other. The interference can be caused from downlink and/or uplink transmissions for macro UE toward neighboring small cell UE, from downlink and/or uplink transmissions for small cell UE toward neighboring macro UE, from downlink and/or uplink transmissions for small cell UE served by one small cell radio toward small cell UE served by a neighboring cell radio and/or from downlink and/or uplink transmissions for macro cell UE served by one macro cell radio toward macro cell UE served by a neighboring macro cell radio.

3GPP specifications define different interference mitigation schemes such as, for example, interference reduction and inter-cell interference coordination (ICIC). Interference reduction is typically associated with optimizing coverage and capacity for a network. ICIC is typically associated with the management of radio resources to mitigate inter-cell interference. In the frequency domain, ICIC is often used to manage the allocation of PRBs between cells in order to coordinate the use of frequency domain resources. In particular, frequency domain ICIC can be used to mitigate inter-cell interference with neighboring cells for UEs located at the edge of a coverage area of a given serving cell (e.g., cell edge UEs) that may have resources allocated thereto, which can interfere with the neighboring cells.

3GPP Release 8 and Release 9 introduced frequency domain ICIC techniques such as Fractional Frequency Reuse (FFR) to enable ICIC in a cellular network in order to mitigate interference between neighboring cell radios. Typically, FFR is implemented in a homogenous network (e.g., consisting only of small cell radios or only of macro cell radios). A basic tenet of FFR is to partition a cell radio's bandwidth for resource (e.g., PRB) allocation so that cell edge UE served by neighboring cell radios do not interfere with each other and that the interference received by (and created by) cell interior UEs is reduced.

The use of FFR to mitigate interference for cellular network represents a tradeoff between providing improvements in throughput rate and coverage area for cell edge UE while balancing the sum total network throughput rate and spectral efficiency for all UEs served in the cellular network. There are two common FFR models: strict FFR and Soft Frequency Reuse (SFR). Strict FFR is a modification of the traditional frequency reuse in which exterior frequency subbands are not shared with inner frequency bands. Soft Frequency Reuse (SFR) employs the same cell-edge bandwidth partitioning strategy as Strict FFR, but the interior UEs are allowed to share subbands with edge UEs in other cells. Accordingly, shared subbands by interior UEs can be transmitted at lower power levels than for the cell edge UEs. SFR is generally more bandwidth efficient than strict FFR, but results in more interference to both cell-interior and edge UEs. Thus, FFR provides various frequency domain ICIC techniques, which can be implemented in order to mitigate inter-cell interference between neighboring cell radios in a communication network.

3GPP Release 10 introduced time domain ICIC techniques to provide enhanced ICIC (eICIC) in cellular networks in order to mitigate interference for HetNets. Time domain ICIC techniques incorporate the use of Almost Blank and non-Almost Blank Subframes (ABS and non-ABS, respectively), which can be implemented by macro cell radios for macro UE resource scheduling that can be coordinated among cell radios in a given cellular network. For time domain ICIC, small cell radios and macro cell radios can coordinate downlink transmissions to UE served thereby through the use of an ABS pattern, typically determined by a given macro cell radio, in which the macro cell radio may not transmit data traffic to UE served thereby on ABS subframes and any control traffic that may be transmitted during such ABS subframes may be of such a low power as to not interfere with UE served by neighboring small cell radios. Neighboring small cell radios can schedule downlink transmissions to UE served thereby, typically for cell edge UEs, during the ABS subframes of neighboring macro cell radios. The ABS pattern information of macro cell radios can be shared or gathered with neighboring small cell radios using a variety of techniques.

Recently, power domain coordination using MUST has been introduced as yet another technique to reduce interference among neighboring cell radios. MUST is considered a promising technology to help meet 5G radio access requirements. As discussed, MUST provides for the ability to use a superposition scheme that allows multiple users to share the same radio resources in frequency and time with or without spatial separation. In some cases, it can be possible to use different MIMO layers, which can be shared between near and far UEs, through power domain superposition. MUST enables the use of a linear superposition coding scheme to schedule transmissions for multiple UEs with different power level allocations but using the same precoding vectors or matrices such that each vector represents a spatial stream (e.g., layer) mapped to a different antenna port.

Generally, when a UE receives a downlink transmission at its receiver, the receiver demodulates the signal and decodes its codeword, which is then converted into a transport block from which symbols containing resources for the UE can be recovered. For a MUST deployment, respective MUST capable UE(s) can be configured to perform, at their respective receiver(s), demodulation of a received signal to decode and then cancel transmission(s) meant for other UE(s) having codeword(s) transmitted at a higher power than their respective codeword. The cancelling can be performed successively using SIC until all higher power level codeword(s) have been cancelled from the signal. Each respective MUST capable UE(s) that is to perform SIC can be provided respective SIC assistance parameters that assist each respective UE in performing SIC on received signals. SIC assistance parameters can be sent to UE in the PDCCH for each TTI. Upon cancelling higher power level symbols from a received signal, a UE can decode its respective codeword transmitted in the PDSCH.

In the case of co-channel HetNet deployments (e.g., deployments in which macro and small cell radios are deployed to use the same carrier frequency), scheduling and multiplexing users simply using ABS for interference protection for the small cell UEs would lead to under-utilization of the radio resources and capacity. To realize reductions in interference, to realize optimal utilizations of radio resources leading to high system throughput and/or to meet the 5G requirements, a solution is needed which provides for the coordination of PDIC information through network interfaces such as X2, RRC interfaces such as Uu and/or OAM/SON interfaces and for providing UE with SIC assistance parameters to perform SIC.

In accordance with at least one embodiment, communication system 100 is configured to provide a system and method to facilitate PDIC in a network environment by providing for the ability to coordinate downlink and/or uplink transmission power levels between at least one macro cell radio (e.g., macro cell radio 108) and at least one neighboring small cell radio (e.g., one or both of small cell radios 104.1-104.2) for one or more PRBs within one or more subframes for downlink transmissions to UE capable of performing MUST based PDIC and/or for uplink transmissions from UE to a MUST capable serving cell radio. In at least one embodiment, the power level coordination can be performed between macro and small cell radios in a deployment. In at least one embodiment, the power level coordination can be performed between macro and small cell radios in a deployment and additionally between the small cell radios themselves. In at least one embodiment, power level coordination can be performed only between small cell radios themselves.

While ABS mechanisms can still be used for legacy small cell UEs to protect against macro cell radio interference, communication system 100 can provide for the ability of small cell radios within the communication system to advantageously allocate, to MUST capable UE served thereby, radio resources (e.g., PRBs) that may already be allocated to macro cell UEs by a neighboring macro cell radio. Accordingly, communications system 100 can provide for coordinating and scheduling radio resources between macro cell radios and small cell radios in the time, frequency and power domains effectively increasing overall system capacity and throughput. In various embodiments, operations of macro cell radio 108 and small cell radios 104.1-104.2 can be tightly synchronized at the subframe level to enable time, frequency and power domain coordination among the cell radios. In at least one embodiment, synchronization can include phase, time and/or frequency synchronization via a logical port configured for each cell radio. In various embodiments, the method provided by communication system 100 can be carried out using one or more hardware processors configured for small cell radios 104.1-104.2, macro cell radio 108, central management system 116 (if implemented) and/or one or more UE, depending on the deployment configuration of communication system 100.

Consider an operational example in which PDIC is performed within communication system 100 between macro cell radio 108 and at least one of small cell radios 104.1-104.2. Referring to FIG. 1C, FIG. 1C is a simplified schematic illustrating example details that can be associated with PDIC that can be performed between macro cell radio 108 and small cell radio 104.1 for a number of subframes in accordance with at least one potential embodiment of communication system 100. As discussed in further detail below, small cell radio 104.2 may determine that PDIC with macro cell radio 108 may not be needed and/or may not be possible for downlink and/or uplink transmissions that it is to schedule for $UE_{S2(102.1)}$. However, time and frequency domain coordination can, in various embodiments, still be performed for small cell radio 104.2. It should be understood that the operational example involving macro cell radio 108 and small cell radios 104.1-104.2 is provided to exemplify various example operational features that can be performed within communication system 100 and is not meant to limit the broad scope of the teachings of the present disclosure.

FIG. 1C illustrates an example system frame for each of small cell radio 104.1, small cell radio 104.2 and macro cell radio 108. For the embodiments shown in FIG. 1C, time domain information is illustrated across each of a 1 msec subframe (SF0-SF9) for a given system frame (SFN0) for each cell radio. Each of SF0-SF9 includes 2 PRBs. For the embodiment shown in FIG. 1C, it is assumed that each PRB for each subframe spans a particular subcarrier range (e.g., a particular sub-band of 12 subcarrier frequencies), although the particular range is not illustrated. Further for the embodiment shown in FIG. 1C, it is assumed that $UE_{M(102.1)}$-$UE_{M(102.3)}$ are MUST capable UE for which macro cell radio 108 is to schedule downlink and/or uplink transmissions for the UE using power domain coordination techniques discussed herein.

During operation, in at least one embodiment, PDIC parameters can be negotiated between macro cell radio 108 and one or more of neighboring small cell radios 104.1-104.2. Negotiation of PDIC parameters between neighboring cell radios can facilitate power domain coordination of radio resources among the cell radios for various embodiments as described herein. In general, the negotiating can include exchanging PDIC parameters between cell radios using a handshaking technique in which one cell radio determines a set of PDIC parameters that indicates, along with other PDIC parameters, potential PRBs for one or more subframes/system frames for which PDIC can be performed and sends the set of PDIC parameters to one or more other cell radio(s). The other cell radio(s) can respond to the cell radio from which the set PDIC parameters were received, directly or indirectly, with another set of PDIC parameters determined at each of the other cell radio(s). The set of PDIC parameters determined at one of the other cell radio(s) can include an indication of whether the cell radio will participate in power domain coordination for each of the potential PRBs for each subframes/system frames for which PDIC can be performed along with other PDIC parameters determined at the cell radio that can facilitate power domain coordination.

In one embodiment, negotiating between cell radios can be performed via direct exchanges between the cell radios via the X2 interfaces interconnected the cell radios. In another embodiment, the negotiating can be performed via indirect exchanges in which PDIC parameters can be exchanged between cell radios via the central management system 116. In various embodiments, ABS pattern information can be sent from macro cell radio 108 directly or indirectly to small cell radios 104.1-104.2.

In at least one embodiment, macro cell radio 108 can generate PDIC parameters, referred to herein as 'macro PDIC parameters' that can be negotiated with small cell radio(s) in order to determine power allocations for macro UE transmissions. In various embodiments, the generating can include, but not be limited to: determining and setting an indication for each potential PRB for each SF/SFN that indicates whether PDIC can or cannot be performed for each of a corresponding PRB; determining and setting an indication that indicates maximum transmit power that can be set by the macro cell radio for transmission of each PRB for each SF/SFN for which PDIC can be performed; determining and setting an indication for a maximum MCS or an MCS range that the macro cell radio can schedule for downlink and/or uplink transmissions for each PRB for each SF/SFN for which PDIC can be performed; determining and setting one or more indication(s) for one or more power ratio(s) that is/re to be used for scheduling transmissions by the macro cell radio for each PRB for each SF/SFN for which PDIC can be performed; determining and setting a transmission mode indicator for each PRB for each SF/SFN for which PDIC can be performed; determining and setting a MUST mode indicator (e.g., NOMA, SOMA, REMA); optionally determining and setting an indication indicating number of superposition layers that can be used for transmissions (e.g., for MU-MIMO) for each PRB for each SF/SFN for which PDIC can be performed; optionally determining and setting any other MU-MIMO-related information such as, for example, CQI, Precoding Matrix Indicator (PMI), Rank Indicator (RI), etc. In general, PMI relates to weights that can be applied during precoding for a particular layer (e.g., for a particular antenna port). In general, RI relates to the performance level expected for a given antenna port.

In some embodiments, macro PDIC parameters generated by macro cell radio 108 that correspond to an indication, value, etc. determined and set for each potential PRB for which PDIC can be performed can be formatted according to an N×M matrix in which each row can represent a PRB index and each column can represent a SF index/SFN index. In this manner, time, frequency and power domain information can be communicated from the macro cell radio 108 to small cell radios 104.1-104.2 in order to initiate negotiating PDIC parameters between the cell radios. In various embodiments, macro PDIC parameters can be carried in one or more Information Element(s) (IE(s)) within a 3GPP 'X2AP RESOURCE STATUS REQUEST' message that can be enhanced to carry the IEs.

For example, in one embodiment, one or more PRB index and SF/SFN index value(s) can be set for an IE to indicate the potential PRB(s) for one or more subframe(s) and corresponding system frame(s) for which PDIC can be performed for downlink and/or uplink transmissions. In various embodiments, the IE can be formatted using a bit string or bitmap in which each position in the bit string or bitmap represents a particular PRB for a particular subframe of one or more system frames. By setting each bit in the bit string or bitmap frequency and time domain information is generated to indicate whether PDIC can be performed for each of a PRB for each particular subframe within each system frame. For example, in one embodiment, a value of '1' in a particular bit position could be used to indicate that PDIC can be performed for a corresponding PRB index within a particular subframe while a value of '0' in a particular bit position could be used to indicate that no PDIC can be performed for a corresponding PRB index for a particular subframe. Other values or schemes could be used in other embodiments to communicate frequency and time domain information.

In at least one embodiment, the maximum transmit power that can be used for transmission of each PRB for which PDIC can be performed can be sent in another IE, which can also be represented as an N×M matrix in which the N rows represent a maximum transmit power, which can be represented as $\alpha$, for each PRB index and the M columns represent SF/SFN indexes. In some embodiments, the maximum transmit power can be expressed as Relative Narrowband Transmit Power (RNTP).

Further, in at least one embodiment, the maximum MCS for each PRB can sent in another IE, which can also be represented as an N×M matrix formatted to carry maximum MCS information for each PRB for each SF/SFN, as discussed herein. Further, in at least one embodiment, one or more power ratio(s) that is/are to be used for scheduling transmissions to macro UE(s) for each PRB for each SF/SFN that are to be superposed in the power domain (e.g., for which PDIC can be performed) can be sent in another IE, which can also be represented as an N×M matrix in which the N rows carry power ratio information indicating one or more ratio(s), each power ratio representing PDSCH Energy per Resource Element (EPRE) to Cell-Specific Reference Signal (CRS) EPRE corresponding to power level allocations that can be set for transmissions for the macro UEs for the identified PRBs of each subframe/system frame. In general, a power ratio identifies a portion of the maximum transmit power that is to be utilized by the macro cell radio for scheduling transmissions for macro UEs for each MUST PRB in which a larger ratio corresponds to a higher the power level allocation for transmission of a given PRB and a smaller ratio corresponds to a lower power level allocation for transmission of a given PRB. In various embodiments, an index for a given PRB for a given SF/SFN can include a list of one or more power ratio(s) such that each ratio corresponds to a power ratio that is to be assigned to each UE served by a cell radio for the given PRB for the given SF/SFN.

Other macro PDIC parameters that can be determined by the macro cell radio 108 can include, but not be limited to: RI, PMI, transmission mode, superposition layers, SINR information and/or any other parameters, which may be used to perform PDIC as may be defined in 3GPP standards (e.g., TS 36.331, 36.213, etc.). In various embodiments, transmission mode (TM) can be set to a value between 1 and 10, which can relate to a number of antenna ports, multiplexing, transmit diversity, MU-MIMO and/or other parameters relevant to transmissions that may be defined in 3GPP TS 36.213, Section 7.1. In some embodiments, as discussed herein, PDIC parameters negotiated between cell radios that relates to particular PRBs for each SF/SFN can be formatted using an N×M matrix format such that cell radios/receivers can perform PDIC for appropriate PRB within each SF/SFN. In some embodiments, however, PDIC parameters negotiated between cell radios may not be formatted according to an N×M matrix format.

For the present operational example, it is assumed that macro cell radio 108 sends macro PDIC parameters identifying, as shown in the embodiment of FIG. 1C, that PRBs for a particular sub-band in SF1/SFN0, SF4/SFN0, SF7/SFN0 and SF9/SFN0 for which PDIC can be performed for downlink transmissions. Additional macro PDIC parameters can be sent by the macro cell radio 108, as discussed above. Although downlink transmissions are described for the embodiment of FIG. 1C, it should be understood that PDIC operations for uplink transmissions can be performed in a similar manner as described for downlink transmissions discussed herein.

For the present operational example, upon receiving the macro PDIC parameters from macro cell radio 108 (e.g., directly or indirectly), each small cell radio 104.1-104.2 can determine whether any of the potential PRBs for which PDIC can be performed would be useful for downlink transmissions for any UE served by each small cell radio 104.1-104.2. By 'useful' it is meant that one or more UE served by a given small cell radio are capable of performing MUST-based SIC on downlink transmissions and such transmissions would benefit the capacity and throughput of the small cell radio. Benefits in capacity and throughput, which may result from power domain coordination, can be viewed from the perspective of resource scheduling. Without the knowledge of PDIC on a PRB/subframe level, each small cell will treat all the non-ABS subframes (and corresponding PRBs) as interfered PRBs and not aggressively schedule resources on those PRBs, which can reduce overall capacity and throughput for the system. With knowledge of PDIC on a PRB/subframe level, a neighboring macro cell radio can schedule PDIC for PRBs/subframes more sensibly knowing what resources are going to be used by small cell radios for MUST capable UEs. Further with knowledge of PDIC on a PRB/subframe level, small cell radios can schedule higher power PDIC PRBs/subframes for MUST UEs using superposition in the power domain making more efficient use of the PRB/subframe indexes, which can improve capacity and throughput for the system.

However, depending on the location of a given MUST capable UE within the coverage are of a given small cell radio, (e.g., as cell interior UE or cell edge UE), the number of UE served by a given small cell radio, and/or whether a cell radio serves MUST capable and/or non-MUST capable UEs, PDIC for a particular small cell radio may not benefit system capacity and throughput. For example, using PDIC for resource allocation for a small cell radio serving a small number of UE, cell interior UE and/or serving non-MUST capable UE may determine that PDIC would not benefit capacity and throughput.

For the present operational example, it is assumed that small cell radio 104.1 determines that both $UE_{S1(102.1)}$ and $UE_{S1(102.2)}$ are MUST capable UEs and power domain coordination with macro cell radio 108 would allow the cell radio to more aggressively schedule resources for downlink transmissions (e.g., thereby increasing system capacity and throughput) based, at least in part, on the macro PDIC parameters received from macro cell radio 108. Further for the present operational example, it is assumed that small cell radio 104.2 determines that $UE_{S2(102.1)}$ is either a non-MUST capable UE or that power domain coordination would not benefit system capacity.

To complete the negotiating with macro cell radio 108, each small cell radio 104.1-104.2 can generate PDIC parameters, referred to herein as 'small cell PDIC parameters', to send to the macro cell radio 108, directly or indirectly. In at least one embodiment, small cell PDIC parameters generated by a given small cell radio can include, at a minimum, determining and setting an indication identifying whether or not the small cell radio will participate in power domain coordination with the macro cell radio. In one embodiment, a 3GPP 'X2AP RESOURCE STATUS RESPONSE' message sent from a given small cell radio can be enhanced to carry the indication of whether or not the small cell radio will participate in power domain coordination with a macro cell radio. In one embodiment, an indication of whether a given cell radio will not participate in power domain coordination with another cell radio can include setting single response indicator that indicates that the cell radio will not participate in the coordination.

In another embodiment, a given cell radio can determine and set an indication for each of one or more PRBs for each of the one or more subframes and system frames that identifies whether the cell radio will participate in power domain coordination for each of the PRBs for each subframe/system frame. In such an embodiment, the indications can be represented using an N×M matrix, which can be sent as a bit string or bitmap using an IE carried in an X2AP RESOURCE STATUS RESPONSE message that can be enhanced to carry the IE.

Other small cell PDIC parameters can be generated by a small cell radio that is to participate in power domain coordination for one or more PRBs. In various embodiments, other small cell PDIC parameters that can be generated by a given small cell radio can include, but not be limited to: determining and setting an indication for one or more power ratio(s) to be used for scheduling transmissions for small cell UE(s) served by the small cell radio for each of the one or more PRBs for each SF/SFN for which the small cell radio will participate in PDIC with the macro cell radio (e.g., a list of one or more ratio(s) could be identified for a given PRB for a given SF/SFN if the small cell radio is to schedule transmissions for multiple UE for the given PRB for the given SF/SFN); determining and setting an indication for a superposition MCS range to be used for scheduling transmissions for small cell UEs for each of the one or more PRBs for each SF/SFN for which the small cell radio will participate in PDIC with the macro cell radio; determining and setting an indication for a transmission mode to be used for scheduling transmissions for small cell UEs for each of the one or more PRBs for each SF/SFN for which the small cell radio will participate in PDIC with the macro cell radio; optionally determining and setting a number of superposition layers (e.g., for MU-MIMO) to be used for scheduling transmissions for small cell UEs for each of the one or more PRBs for each SF/SFN for which the small cell radio will participate in PDIC with the macro cell radio; and/or optionally determining and setting other optional MU-MIMO information (e.g., CQI, RI, PMI, etc.) for each of the one or more PRBs for each SF/SFN for which the small cell radio will participate in PDIC with the macro cell radio.

Other small cell PDIC parameters that can be generated by the small cell radio can include, but not be limited to: SINR information, interference cancellation method of UE(s) that are to perform SIC, Radio Resource Management information, and/or any other parameters and/or information that may be used to perform PDIC as may be defined in 3GPP standards (e.g., TS 36.331, 36.213, etc.). In various embodiments, an interference cancellation method that may be performed by UE(s) can include, but not be limited to: Minimum Mean-Square Error (MMSE), Symbol-Level Interference Cancellation (SLIC), Reduced-complexity Maximum Likelihood (RML), etc.

For the present operational example, it is assumed that small cell radio 104.1 generates and sends small cell PDIC parameters to macro cell radio 108 indicting the PRBs for the particular sub-band for each SF/SFN (e.g., SF1/SFN0, SF4/SFN0, SF7/SFN0 and SF9/SFN0) for which it will participate in power domain coordination with the macro cell radio. Other small cell PDIC parameters can be generated by small cell radio 104.1 and sent to macro cell radio 180, as discussed for various embodiments described herein. For the present operational example, small cell radio 104.2 can generate small cell PDIC parameters to send to macro cell radio 108 indicating that the small cell radio 104.2 will not participate in PDIC with the macro cell radio 108.

In an embodiment in which both small cell radios 104.1 and 104.2 were to perform PDIC, then the small cell radios would also have to negotiate PDIC parameters between themselves to avoid scheduling conflicting transmissions at a same power level to different UE. In such an embodiment, the small cell radios could negotiate PDIC parameters either directly or indirectly in a similar manner as described for the negotiating that can be performed between macro and small cells. For example, small cell radios 140.1 and 140.2 could perform handshaking via a number of X2AP RESOURCE STATUS REQUEST/RESPONSE exchanges to coordinate resources between themselves within the bounds of the information sent from the macro cell radio via macro PDIC parameters.

Each small cell radio that is to participate in power domain coordination with the macro cell radio can determine SIC assistance parameters to send its MUST capable UEs for which SIC is to be performed to replicate multiuser interleaving on the PRBs/sub-bands for the subframes and system frames identified in the small cell PDIC parameters. The macro cell radio can also determine SIC parameters to send to its MUST capable UEs for which SIC is to be performed on transmissions. SIC assistance parameters can be sent in the PDCCH to each UE that is to perform SIC for each TTI. In at least one embodiment, SIC assistance parameters can be sent to near UE(s) that are to perform SIC while a UE that receives a highest power allocation for transmissions can treat lower power transmissions as noise to demodulate and decode transmissions. However, in another embodiment, all MUST capable UEs that are to perform SIC for MUST transmissions can be sent SIC assistance parameters to perform SIC on the transmissions in order to decode their respective codewords accordingly.

In various embodiments, SIC assistance parameters sent to a particular MUST capable UE can include power domain protected information including, but not limited to: a superposition presence indication to indicate a transmission for the particular UE having superposed resources (e.g., a bit or flag set to indicate presence or absence of superposition); a maximum transmit power of the transmission for the particular UE; a power ratio of the transmission (e.g., PDSCH EPRE to CRS EPRE) for the particular UE; MCS of the transmission for the particular UE, equivalent MCS of the transmission for the particular UE due to superposition, a transmission mode of the transmission for the particular UE; and any optional MU-MIMO related information for the transmission for the particular UE. SIC assistance parameters can be sent to UE using RRC Medium Access Control (MAC) Layer 1 (L1) signaling.

In at least one embodiment, equivalent MCS due to superposition can be an equivalent superposition that can be created due to superposition. For example, a modulation of QPSK in the PDSCH for near UE and a modulation of QPSK in the PDSCH for far UE can create an equivalent MCS due to the superposition of 16QAM.

For the present operational example, for each identified PRB/sub-band for the subframes and system frames for which PDIC is to be performed, small cell radio 104.1 will determine and send SIC assistance parameters to $UE_{S1(102.1)}$ and $UE_{S1(102.2)}$ so that the UEs can perform SIC on downlink transmissions. As SIC assistance parameters can be determined per TTI for PDSCH transmissions, SIC assistance parameters for each UE can be determined by small cell radio 104.1 during scheduling operations that can be carried out via a scheduler/scheduling algorithm that can operate to schedule transmissions using PDIC parameters negotiated with the macro cell radio, any ABS and/or other information received from the macro cell radio as well as UE feedback information received from each of $UE_{S1(102.1)}$ and $UE_{S1(102.2)}$ (e.g., CQI, Hybrid Automatic Repeat Request (HARQ) acknowledgment/no-acknowledgment (ACK/NACK) information, measurement reports, etc.).

As shown in the embodiment of FIG. 1C, small cell radio 104.2 is assumed for the present operational example to not be participating in PDIC with macro cell radio 108 or small cell radio 104.2. However, small cell radio 104.2 can still participate in time domain coordination with macro cell radio 108 for any downlink transmissions for cell edge UE that may be served thereby, although none are shown in FIG. 1A, for any ABS subframes (e.g., SF3, SF5, SF8). Downlink transmissions for cell interior UE served by the small cell radio (e.g., $UE_{S2(102.1)}$) can be scheduled at other times (e.g., for non-ABS subframes and/or subframes for which power domain coordination is applied by the macro cell radio). Frequency domain information is not illustrated in the embodiment of FIG. 1C, yet small cell radio 104.2 could, in some embodiments, participate in frequency domain interference coordination with one or both of macro cell radio 108 and small cell radio 104.1.

As noted, it is assumed for the present operational example that small cell radio 104.1 is participating in PDIC with macro cell radio 108. Five power levels are illustrated in FIG. 1C, a highest power level A ($PL_A$) followed by $PL_B$, $PL_C$, $PL_D$ and $PL_E$. As noted, each UE can be allocated a power level for transmissions, which can be represented as a power ratio relating PDSCH EPRE for a given UE to CRS EPRE. A UE allocated $PL_A$ can have a larger power ratio relative to CRS EPRE than a UE allocated $PL_E$. The power ratio for the power level allocated to $UE_{S1(102.2)}$ (e.g., $PL_B$) is identified in FIG. 1C. The power ratio for $UE_{S1(102.2)}$ for $PL_B$ is larger than the power ratio for $UE_{S1(102.1)}$ for $PL_C$ for the present operational example in SF1/SFN0, SF4/SFN0 and SF9/SFN0; however, the power ratios for the UEs can be switched in SF7/SFN0, which is discussed in further detail below.

It is not necessary that power levels allocated to UE served by a given cell radio be contiguous in the power domain. Rather, a UE can be allocated a power level based on one or more of: location of the UE relative to surrounding UE; location of the UE relative to its distance from its serving cell radio; CQI or other signal strength information reported by the UE; any Quality of Service (QoS), policy and/or subscription related information associated with a subscriber associated with the UE and/or any traffic flows for the subscriber/UE; combinations thereof or the like. In at least one embodiment, distance between a cell radio and a UE can be determined based on path loss, which can be determined based on signal strength information (e.g., RSRP, RSRQ, etc.) that can be reported by UE in measurement reports sent by the UE.

For the embodiment shown in FIG. 1C, power level allocations for the macro UE served by macro cell radio 108 are not contiguous in the power domain. Although the power level allocations for the small cell UE served by small cell radio 104.1 are shown as being contiguous in the power domain, it should be understood that contiguous power allocations are not necessary in accordance with various embodiments described herein.

As shown in the embodiment of FIG. 1C, macro cell radio 108 can schedule PDIC downlink transmissions for $UE_{M(102.1)}$, $UE_{M(102.2)}$, and $UE_{M(102.3)}$ in SF1, SF4, SF7 and SF9 of SFN0. $UE_{M(102.3)}$ being furthest from macro cell radio 108 and near the coverage area of small cell radio 104.1 can, in at least one embodiment, be allocated the highest power level, $PL_A$. The remaining UEs, $UE_{M(102.2)}$ a and $UE_{M(102.1)}$ are illustrated as not being located near the coverage area of a small cell radio while being located relatively closer to macro cell radio 108 than $UE_{M(102.3)}$. Based on their locations, $UE_{M(102.2)}$ can be allocated $PL_D$ and UEM(102.1) can be allocated $PL_E$ in accordance with at least one embodiment and each UE can perform SIC to cancel higher level powers to decode their corresponding codeword for each PRB of each subframe.

For the embodiment shown in FIG. 1C, macro cell radio 108 could determine, among other macro PDIC parameters described for various embodiments described herein, macro PDIC parameters for SF1, SF4, SF7, and SF9 of SFN0 in which a PRB index for each SF/SFN identifies a list of power ratios for each macro UE served by the cell radio. For example, the list could identify a power ratio for $PL_A$, a power ratio for $PL_D$ and a power ratio for $PL_E$ relative to a CRS EPRE for a given PRB index. Consider, for illustrative purposes only, that the ratios could correspond to a ratio of 0.35 for $PL_A$, a power ratio of 0.15 for $PL_D$ and a power ratio of 0.1 for $PL_E$. The total power ratio for transmissions to be scheduled by the macro cell radio could equal 0.6 (0.35+0.15+0.1=0.6). Thus for PDIC for the embodiment shown in FIG. 1C, small cell radio 104.1 could determine power ratios for transmissions to be scheduled by the small cell radio within the remaining 0.4 portion of the power spectrum for the given PRB for SF1, SF4, SF7 and SF9 of SFN0 (e.g., 0.35+0.15+0.1+0.4≤1.0) under a constraint that the total power ratio for all transmissions for the PRB is less than or equal to 1. In one embodiment, a further constraint can be applied to PDIC operations, which provides that no two UEs can be assigned a same power ratio for a same PRB of a same SF/SFN. However, in another embodiment, this constraint may not be applied such that a same power ratio can be assigned a same power ratio for different power levels.

For the embodiment shown in FIG. 1C, small cell radio 104.1 can schedule PDIC downlink transmissions in SF1, SF4, SF7 and SF9 of SFN0 for $UE_{S1(102.1)}$ and $UE_{S1(102.2)}$. As noted above, for SF1, SF4 and SF9, PRBs for $UE_{S1(102.2)}$ can be allocated a $PL_B$ and PRBs for $UE_{S1(102.1)}$ can be allocated $PL_C$. However, it should be understood that power level allocations for PRBs can be dynamically allocated within subframes of a system frame such that the power allocations for UEs served by a cell radio can be dynamically changed between subframes based on UE movement (e.g., location), distribution within the coverage area of a given cell radio and/or any other information (e.g., signal strength, policy, traffic, etc., as discussed above). As illustrated in SF7/SF0 for the embodiment shown in FIG. 1C, PRBs for $UE_{S1(102.2)}$ can allocated $PL_C$ while PRBs for $UE_{S1(102.1)}$ can be allocated $PL_B$ say, for example, if the locations of the UEs changes relative to each other such that $UE_{S1(102.1)}$ is considered by the small cell radio to be the far UE relative to the location of $UE_{S1(102.2)}$.

Considering the power ratios determined by macro cell radio 108, as discussed above for the embodiment shown in FIG. 1C, small cell radio 104.1 could determine, among other small cell PDIC parameters described for various embodiments described herein, macro PDIC parameters for SF1, SF4, SF7, and SF9 of SFN0 in which a PRB index for each SF/SFN identifies a list of power ratios for each small cell UE served by the cell radio. For example, the list could identify a power ratio for $PL_B$ and a power ratio for $PL_C$ for the given PRB indexes identified to the small cell radio in the macro PDIC parameters received from the macro cell radio 108. Consider, for illustrative purposes only, that the power ratios determined by the small cell radio could correspond to a power ratio of 0.22 for $PL_B$ and a power ratio of 0.18 for $PL_C$ for SF1, SF4 and SG9 (the ratios could be switched for SF7) for an embodiment in which no two UEs for a same PRB for a same SF/SFN can be assigned a same power ratio under the constraint that the total power ratio for transmissions to be scheduled for the PRB is less than or equal to 1.

It is assumed for the purposes of the embodiment of FIG. 1C that each of macro cell radio 108 and small cell radio 104.1 can send SIC assistance parameters to each UE served by each cell radio based on PDIC parameters negotiated between the cell radios as discussed for various embodiments described herein.

Using SIC assistance parameters received by $UE_{S1(102.1)}$, the receiver for $UE_{S1(102.1)}$ can perform SIC operations to demodulate a co-channel transmission received from macro cell radio 108 meant for $UE_{M(102.3)}$ for a particular subframe having superposed resources in the power domain, decode the $UE_{M(102.3)}$ codeword from the signal and then cancel the $UE_{M(102.3)}$ signal from the received signal. SIC operations performed by $UE_{S1(102.1)}$ can include the UE also demodulating a co-channel transmission received from small cell radio 104.1 for a particular subframe, decoding the $UE_{S1(102.2)}$ codeword and cancelling the signal meant for $UE_{S1(102.2)}$ from the transmission. Upon cancelling the signal meant for $UE_{S1(102.2)}$, the receiver for $UE_{S1(102.1)}$ can decode its own codeword within the received transmission to recover its symbols from the PRBs allocated to the UE. $UE_{S2(102.2)}$ can perform SIC operations using its received SIC assistance parameters to cancel the $UE_{M(102.3)}$ signal to decode its codeword in each subframe having superposed resources in the power domain. $UE_{M(102.1)}$ and $UE_{M(102.2)}$ can also perform respective SIC operations using their respective received SIC assistance parameters to cancel higher power level co-channel transmissions in each subframe having superposed resource in the power domain in order to decode their respective codewords.

Accordingly, as shown in the embodiment of FIGS. 1A and 1C, PDIC between macro and small cell radios can be facilitated by the system and method provided by communication system 100.

Referring to FIG. 2, FIG. 2 is a simplified flow diagram illustrating example operations 200 that can be associated with providing power domain interference coordination in a network environment in accordance with one potential embodiment of communication system 100. Operations 200 can be performed between a macro cell radio (e.g., macro cell radio 108) and at least one small cell radio (e.g., one or both of small cell radio(s) 104.1, 104.2).

The operations can begin at 202 and can include negotiating PDIC parameters between a macro cell radio and at least one small cell radio. The negotiated PDIC parameters can include macro PDIC parameters, as discussed for various embodiments described herein, that are determined by the macro cell radio and sent to one or more small cell radio(s). The negotiated PDIC parameters can also include small cell PDIC parameters, as discussed for various embodiments described herein, that are determined by each of the one or more small cell radio(s) and sent to the macro cell radio.

At 204, the operations can include determining respective SIC assistance parameters for each of one or more respective UE that are to perform SIC operations for one or more transmissions. SIC assistance parameters can be determined by the macro cell radio for each respective macro UE served thereby that is to receive superposed transmissions for one or more subframes/system frames and SIC assistance parameters can be determined by each respective small cell radio(s) that is to participate in PDIC with the macro cell radio for each respective small cell UE served thereby that is to receive superposed transmissions for one or more subframes/system frames.

At 206, the operations can include sending to each respective UE respective SIC assistance parameters determined for each respective UE. The sending can be performed by the macro cell radio for each of its respective UE that are to perform SIC operations on superposed transmissions and can be performed by each of the respective one or more small cell radio(s) for each respective UE served thereby that are to perform SIC operations on superposed transmissions.

At 208, the operations can include transmitting respective radio resources (e.g., PRBs) to each of the one or more respective UE based, at least in part, on the negotiated PDIC parameters and the operations can end. In various embodiments, the transmissions can be performed using any combination of time domain, frequency domain and/or power domain interference cancellation techniques discussed for various embodiments described herein.

In various embodiments, the system and method provided by communication system 100 to facilitate PDIC can provide various advantages through efficient coordination of radio resources among MUST capable UEs for superposed transmissions that can be performed using one or more MUST modes. In at least one embodiment, negotiating PDIC parameters between macro and small cell radios in a HetNet deployment to perform PDIC among the cell radios can increase system capacity and throughput (e.g., bits/Hz) for MUST-based accesses in distributed HetNet and co-channel deployments by providing for the efficient and opportunistic utilization of radio resources where multiple users are sharing the same resources that are spatially allocated in the power domain. UEs camped in different co-channel cells of macro and small cell radios can be paired together to form a subset that uses the same radio resources. As discussed for various embodiments described herein, the coordination of resource allocations (e.g., choosing appropriate PRBs, MCS, power ratios, etc.) can be coordinated using X2-based signaling or OAM-based signaling and UE can receive SIC assistance parameters to configure SIC operations via Uu (e.g., RRC/MAC/L1) signaling.

In at least one embodiment, negotiating PDIC parameters between cell radios (e.g., macro to macro negotiating, macro to small cell negotiating, small cell to small cell negotiating) to perform PDIC can also impact the number of ABS subframes that may be provided by a given macro cell radio as the macro cell radio may try to balance the resource sharing using more PDIC frames and reducing the number of ABS frames to a minimum, primarily to protect the transmission of control channel information.

Referring to FIG. 3, FIG. 3 is a simplified flow diagram illustrating example operations 300 that can be associated with providing power domain interference coordination parameters via a given macro cell radio (e.g., macro cell radio 108) in accordance with one potential embodiment of communication system 100. Operations 300 can include the macro cell radio negotiating PDIC parameters with at least one small cell radio such that the negotiating includes generating macro PDIC parameters for one or more subframes of one or more system frames using a set of operations (320), sending the macro PDIC parameters to one or more small cell radios at 330 and receiving small cell PDIC parameters from at least one small cell radio at 332. Upon negotiating PDIC parameters with at least one small cell radio, the operations can include the macro cell radio determining and sending (e.g., generating), at 334, respective SIC assistance parameters for each of its respective UE that are to perform SIC for a particular TTI and, at 336, transmitting radio resources to the respective UE for the TTI.

The operations can continue to 338 at which the macro cell radio determines whether transmissions have been sent for all negotiated PDIC parameters for all subframes and system frames identified via the negotiating with the at least one small cell radio. If not, operations 334, 336 and 338 can be repeated until transmissions have been performed for all the identified subframes and system frames. Once all transmissions for all identified subframes and system frames have been completed, operations can return to the set of operations 320 and the set of operations 320 as well as operations 330, 332, 334, 336 and 338 can be repeated for one or more subsequently identified subframes and system frames.

The set of operations (320) can include, at 302, the macro cell radio determining PRBs for which PDIC can be performed and for which cannot be performed with at least one small cell radio for one or more subframes and one or more system frames. The determining at 302 can include generating an N×M matrix, as discussed for various embodiments described herein, in which each row corresponds to a PRB index for a particular sub-band and each column corresponds to a SF/SFN index and setting and indication at each index indicating whether or not PDIC can be performed for a particular PRB of a particular subframe/system frame.

At 304, the set of operations (320) can include the macro cell radio determining a maximum transmit power that can be used for transmission of each PRB for which PDIC can be performed. The determining at 304 can include generating an N×M matrix in which each index for each particular PRB for which PDIC can be performed is set to a desired maximum transmit power value. In various embodiments, maximum transmit power can be represented using a numerical value or any other value as may be defined according the 3GPP standards (e.g., RNTP) in which each of multiple numerical values can correspond to a particular transmit power, which in some embodiments, can be expressed in decibels (dB).

At 306, the set of operations (320) can include the macro cell radio determining one or more power ratio(s) to be used for each transmission by the macro cell radio for each PRB for which PDIC can be performed. The determining at 306 can also include generating an N×M matrix in which each index for each particular PRB for which PDIC can be performed is identified by a list of one or more power ratio(s) relating PDSCH EPRE to CRS EPRE corresponding to the power level allocation that can be set for each PRB by the macro cell radio for transmission(s) for one or more macro UE(s).

At 308, the set of operations (320) can include the macro cell radio determining a maximum MCS or MCS range that can be used for each transmission by the macro cell radio for each PRB for which PDIC can be performed. The determining at 308 can include generating an N×M matrix in which each index for each particular PRB for which PDIC can be performed is set to a desired maximum MCS or MCS range. In various embodiments, MCS can be represented using a numerical value, range of values or any other value as may be defined according the 3GPP standards in which each of multiple numerical values can correspond to a particular MCS (e.g., QPSK, 16QAM, 64QAM, etc.).

At 310, the set of operations (320) can include the macro cell radio determining a transmission mode that is to be used for each transmission by the macro cell radio for each PRB for which PDIC can be performed. The determining at 310 can include generating an N×M matrix in which each index for each particular PRB for which PDIC can be performed is set to a particular transmission mode value (e.g., a value between 1 and 10 or any other value as may be defined in 3GPP TS 36.213).

At 312, the set of operations (320) can include the macro cell radio determining a MUST mode that is to be used for transmissions of the PRBs for which PDIC can be performed. In one embodiment, the determining at 312 can include setting a MUST mode to a value that corresponds to one of the NOMA, SOMA or REMA modes that can be used for all PRBs for which PDIC can be performed. In another embodiment, the determining at 312 can include generating an N×M matrix in which each index for each particular PRB for which PDIC can be performed is set to a particular MUST mode value that corresponds to one of the NOMA, SOMA or REMA modes that can be used for each transmission.

In some embodiments, such as, for example, if MU-MIMO is implemented for a deployment, the set of operations (320) can optionally include the macro cell radio determining, at 314, MU-MIMO parameters that are to be used for each transmission by the macro cell radio for each PRB for which PDIC can be performed. The determining at 314 can include generating one or more N×M matrices in which each index for each particular PRB for which PDIC can be performed for each matrix can be set to a particular value for a particular MU-MIMO parameter (e.g., number of superposition layers, CQI, PMI, RI, etc.) as may be defined according to 3GPP standards.

Following the set of operations (320), operations 330, 332, 334, 336 and 338 and subsequent repeated operations for subsequent transmissions can be performed as described above. In some embodiments, negotiating PDIC parameters between a macro cell radio and one or more small cell radios can involve multiple iterations of 320, 330 and 332 as the cell radios negotiate parameters for transmissions.

Referring to FIG. 4, FIG. 4 is a simplified flow diagram illustrating example operations 400 that can be associated with providing power domain interference coordination parameters via a given small cell radio (e.g., small cell radio 104.1) in accordance with one potential embodiment of communication system 100. Operations 400 can include the small cell radio negotiating PDIC parameters with at least one small cell radio such that the negotiating includes receiving macro PDIC parameters from the small cell radio at 402 and generating small cell PDIC parameters for one or more subframes of one or more system frames identified in the macro PDIC parameters using a set of operations (420), sending the small cell PDIC parameters to the macro cell radio at 430. Upon negotiating PDIC parameters with the macro cell radio, the operations can include the small cell radio determining and sending (e.g., generating), at 432, respective SIC assistance parameters for each of its respective UE that are to perform SIC for a particular TTI and, at 434, transmitting radio resources to the respective UE for the TTI.

The operations can continue to 436 at which the small cell radio determines whether transmissions have been sent for all negotiated PDIC parameters for all subframes and system frames identified via the negotiating with the macro cell radio. If not, operations 432, 434 and 436 can be repeated until transmissions have been performed for all the identified subframes and system frames. Once all transmissions for all identified subframes and system frames have been completed, operations can return to 402 at which the small cell radio receives macro PDIC parameters for one or more subsequently identified subframes and system frames and the set of operations 420 as well as operations 430, 432, 434 and 436 can be repeated.

The set of operations (420) can include, at 404, the small cell radio determining PRBs for which PDIC can be performed and for which cannot be performed with the macro cell radio for the one or more subframes and one or more system frames identified in the macro PDIC parameters received from the macro cell radio. The determining at 404 can include generating an N×M matrix, as discussed herein, in which each row corresponds to a PRB index for a particular sub-band and each column corresponds to a SF/SFN index and setting and indication at each index indicating whether or not PDIC can be performed for a particular PRB of a particular subframe/system frame.

At 406, the set of operations (420) can include the small cell radio determining one or more power ratio(s) to be used for each transmission by the small cell radio for each PRB for which PDIC can be performed. The determining at 406 can also include generating an N×M matrix in which each index for each particular PRB for which PDIC can be performed is identified by a list of one or more power ratio(s) relating PDSCH EPRE to CRS EPRE corresponding to the power level allocation that can be set for each PRB by the small cell radio for transmission(s) for small cell UE(s).

At 408, the set of operations (420) can include the small cell radio determining a superposition MCS range that can be used for each transmission by the small cell radio for each PRB for which PDIC can be performed. The determining at 408 can include generating an N×M matrix in which each index for each particular PRB for which PDIC can be performed is set to a desired superposition MCS range. In various embodiments, superposition MCS range can be represented using a numerical value, range of values or any other value as may be defined according the 3GPP standards in which each of multiple numerical values can correspond to a particular MCS (e.g., QPSK, 16QAM, 64QAM, etc.).

At 410, the set of operations (420) can include the small cell radio determining a transmission mode that is to be used for each transmission by the small cell radio for each PRB for which PDIC can be performed. The determining at 410 can include generating an N×M matrix in which each index for each particular PRB for which PDIC can be performed is set to a particular transmission mode value (e.g., a value between 1 and 10 or any other value as may be defined in 3GPP TS 36.213).

In some embodiments, such as, for example, if MU-MIMO is implemented for a deployment, the set of operations 420) can optionally include the small cell radio determining, at 412, MU-MIMO parameters that are to be used for each transmission by the small cell radio for each PRB for which PDIC can be performed. The determining at 412 can include generating one or more N×M matrices in which each index for each particular PRB for which PDIC can be performed for each matrix can be set to a particular value for a particular MU-MIMO parameter (e.g., number of superposition layers, CQI, PMI, RI, etc.) as may be defined according to 3GPP standards.

Following the set of operations (420), operations 430, 432, 434, and 436 and subsequent repeated operations for subsequent transmissions can be performed as described above. In some embodiments, negotiating PDIC parameters between a small cell radio and a macro cell radios can involve multiple iterations of 402, 420 and 430 as the cell radios negotiate parameters for transmissions.

Figure 5A:
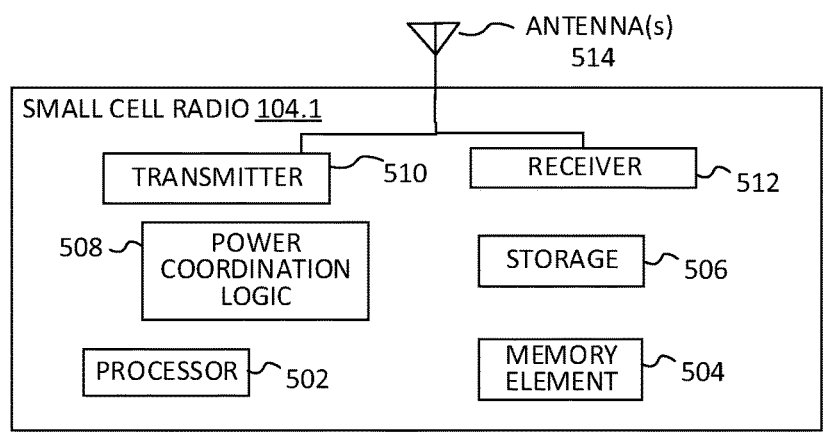
FIGS. 5A-5D are simplified block diagrams illustrating additional details associated with various potential embodiments of the communication system.

Referring to FIG. 5A, FIG. 5A is a is a simplified block diagram illustrating example details that can be associated with an example small cell radio in accordance with one potential embodiment. FIG. 5A includes small cell radio 104.1, which can include at least one processor 502, at least one memory element 504, at least one storage 506, power coordination logic 508, at least one transmitter 510, at least one receiver 512 and at least one antenna 514. Although the embodiment of FIG. 5A is discussed in relation to small cell radio 104.1, it should be understood that the features of small cell radio 104.1 could also be configured for small cell radio 104.2 and/or any other small cell radio that may be present in communication system 100.

In at least one embodiment, at least one processor 502 is at least one hardware processor configured to execute various tasks, operations and/or functions of small cell radio 104.1 as described herein. At least one memory element 504 and/or storage 506 can be configured to store data, information, software and/or instructions associated with the small cell radio 104.1. For example, in various embodiments, at least one memory element 504 and/or storage 506 can be configured to store one or more of: macro PDIC parameters received from a macro cell radio; small cell PDIC parameters generated by the small cell radio; small cell PDIC parameters generated by another cell radio; SIC assistance parameters generated by the small cell radio; PRBs; subscriber/UE information; logic; any other data, information software and/or instructions as discussed for various embodiments described herein (e.g., power coordination logic 508 can, in some embodiments, be stored in at least one memory element 504 and/or storage 506); combinations thereof or the like. In at least one embodiment, at least one transmitter 510, at least one receiver 512 and at least one antenna 514 can be configured to enable over-the-air (OTA) RF communications between small cell radio 104.1 and one or more UE served thereby. In some embodiments, multiple antennae 514 can be configured for small cell radio 104.1 to facilitate MU-MIMO communications.

In at least one embodiment, power coordination logic 508 can include instructions that, when executed (e.g., by at least one processor 502), cause small cell radio 104.1 to perform one or more operations as discussed herein including, but not limited to: negotiating PDIC parameters with one or more macro cell radios and/or one or more small cell radios; generating SIC assistance parameters; sending SIC assistance parameters to UE served thereby; scheduling transmissions to UE served thereby that can utilize time, frequency and/or power domain coordination techniques as described herein; combinations thereof or any other operations described for various embodiments discussed herein. In various embodiments, small cell radio 104.1 can be configured with one or more network interface units (not shown), which can be configured to facilitate communications for the small cell radio within communication system 100 with one or more of small cell radio 104.2 (e.g., via an X2 interface), macro cell radio 108 (e.g., via an X2 interface) and/or central management system 116 (e.g., via Ethernet, Fibre Channel, etc.).

Figure 5B:
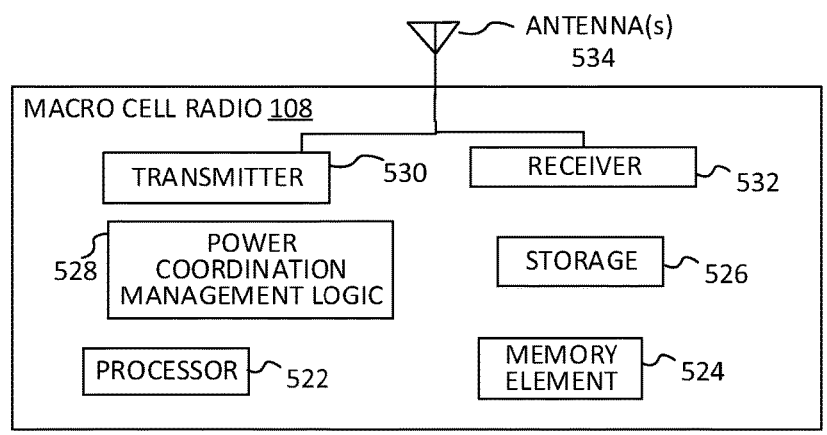

Referring to FIG. 5B, FIG. 5B is a is a simplified block diagram illustrating example details that can be associated with an example macro cell radio in accordance with one potential embodiment. FIG. 5B includes macro cell radio 108, which can include at least one processor 522, at least one memory element 524, at least one storage 526, power coordination management logic 528, at least one transmitter 530, at least one receiver 532 and at least one antenna 534. Although the embodiment of FIG. 5B is discussed in relation to macro cell radio 108, it should be understood that the features of macro cell radio 108 could also be configured for any other macro cell radio that may be present in communication system 100.

In at least one embodiment, at least one processor 522 is at least one hardware processor configured to execute various tasks, operations and/or functions of macro cell radio 108 as described herein. At least one memory element 524 and/or storage 526 can be configured to store data, information, software and/or instructions associated with the macro cell radio 108. For example, in various embodiments, at least one memory element 524 and/or storage 526 can be configured to store one or more of: macro PDIC parameters generated by the macro cell radio; small cell PDIC parameters received from one or more small cell radio; SIC assistance parameters generated by the macro cell radio; PRBs; subscriber/UE information; logic; any other data, information software and/or instructions as discussed for various embodiments described herein (e.g., power coordination management logic 528 can, in some embodiments, be stored in at least one memory element 524 and/or storage 526); combinations thereof or the like. In at least one embodiment, at least one transmitter 530, at least one receiver 532 and at least one antenna 534 can be configured to enable OTA RF communications between macro cell radio 108 and one or more UE served thereby. In some embodiments, multiple antennae 534 can be configured for macro cell radio 108 to facilitate MU-MIMO communications.

In at least one embodiment, power coordination management logic 528 can include instructions that, when executed (e.g., by at least one processor 522), cause macro cell radio 108 to perform one or more operations as discussed herein including, but not limited to: negotiating PDIC parameters with one or more macro cell radios and/or one or more small cell radios; generating SIC assistance parameters; sending SIC assistance parameters to UE served thereby; scheduling transmissions to UE served thereby that can utilize time, frequency and/or power domain coordination techniques as described herein; combinations thereof or any other operations described for various embodiments discussed herein. In various embodiments, macro cell radio 108 can be configured with one or more network interface units (not shown), which can be configured to facilitate communications for the macro cell radio within communication system 100 with one or more of small cell radio 104.1 (e.g., via an X2 interface), small cell radio 104.2 (e.g., via an X2 interface) and/or central management system 116 (e.g., via Ethernet, Fibre Channel, etc.).

Figure 5C:
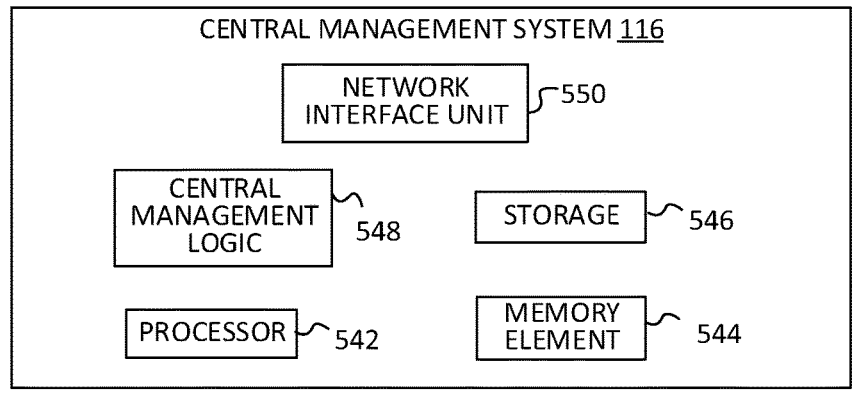

Referring to FIG. 5C, FIG. 5C is a simplified block diagram illustrating example details that can be associated with an example central management system in accordance with one potential embodiment. FIG. 5C includes central management system 116, which can include at least one processor 542, at least one memory element 544, at least one storage 546, central management logic 548 and a network interface unit 550.

In at least one embodiment, at least one processor 542 is at least one hardware processor configured to execute various tasks, operations and/or functions of central management system as described herein. At least one memory element 544 and/or storage 546 can be configured to store data, information, software and/or instructions associated with the central management system. For example, in various embodiments, at least one memory element 544 and/or storage 546 can be configured to store one or more of: macro PDIC parameters generated by the macro cell radio; small cell PDIC parameters generated by one or more small cell radio; subscriber/UE information; cell radio configuration information; policy and/or charging information; logic; any other data, information software and/or instructions as discussed for various embodiments described herein (e.g., central management logic 548 can, in some embodiments, be stored in at least one memory element 544 and/or storage 546); combinations thereof or the like.

In at least one embodiment, central management logic 548 can include instructions that, when executed (e.g., by at least one processor 542), cause central management system 116 to perform one or more operations as discussed herein including, but not limited to: configuring one or more macro and or small cell radios for a deployment (e.g., configuring carrier frequency information, cell identifier information, etc.); facilitating the negotiation of PDIC parameters between one or more macro cell radios and/or one or more small cell radios; combinations thereof or any other operations described for various embodiments discussed herein.

In various embodiments, network interface unit 550 enables communication between central management system 116 and one or more macro and/or small cell radios (e.g., via a 3GPP X2 or similar interface) and/or any other elements that may be configured for communication system 100. In some embodiments, network interface unit 550 can be configured with one or more Ethernet driver(s), Fibre Channel driver(s), etc. and/or controller(s) or other similar network interface driver(s) and/or controller(s) to enable communications for central management system 116 within communication system 100.

Figure 5D:
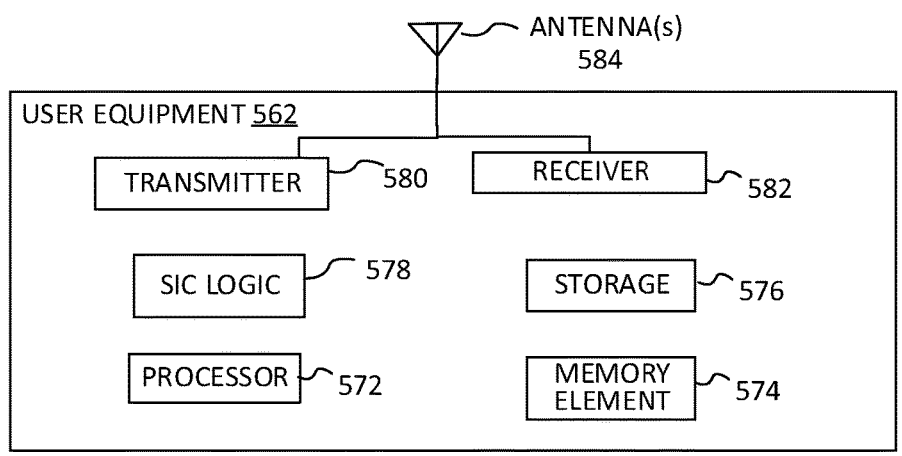

Referring to FIG. 5D, FIG. 5D is a is a simplified block diagram illustrating example details that can be associated with an example user equipment in accordance with one potential embodiment. FIG. 5D includes UE 562, which can include at least one processor 572, at least one memory element 574, at least one storage 576, SIC logic 578, at least one transmitter 580, at least one receiver 582 and at least one antenna 584. In various embodiments, UE 562 can be any MUST capable macro UE (e.g., any of macro $UE_{M(102.1)}$-$UE_{M(102.3)}$) and/or MUST capable small cell UE (e.g., any of small cell $UE_{S1(102.1)}$, $UE_{S1(102.2)}$ and/or $UE_{S2(102.1)}$) that may be present in communication system 100.

In at least one embodiment, at least one processor 572 is at least one hardware processor configured to execute various tasks, operations and/or functions of the UE as described herein for downlink and/or uplink transmissions. At least one memory element 574 and/or storage 576 can be configured to store data, information, software and/or instructions associated with the UE as described herein. For example, in various embodiments, at least one memory element 574 and/or storage 576 can be configured to store one or more of: SIC assistance parameters received from its serving cell radio; transmission blocks; PRBs; subscriber/UE information; logic; any other data, information software and/or instructions as discussed for various embodiments described herein (e.g., SIC logic 578 can, in some embodiments, be stored in at least one memory element 574 and/or storage 576); combinations thereof or the like. In at least one embodiment, at least one transmitter 580, at least one receiver 582 and at least one antenna 584 can be configured to enable OTA RF communications between the UE and one or more cell radios and/or other UE. In some embodiments, multiple antennae 584 can be configured for the UE to facilitate MU-MIMO communications.

In at least one embodiment, SIC logic 578 can include instructions that, when executed (e.g., by at least one processor 572), cause the UE to perform one or more operations as discussed herein including, but not limited to: receiving SIC assistance parameters from its serving cell radio; performing SIC operations on co-channel transmissions; combinations thereof or any other operations described for various embodiments discussed herein.

In regards to the internal structure associated with communication system 100 described herein, $UE_{S1(102.1)}$-$UE_{S1(102.2)}$, $UE_{S2(102.1)}$, $UE_{M(102.1)}$-$UE_{M(102.3)}$ and small cell radio 104.2 can also be configured to include a respective at least one processor, a respective at least one memory element and/or a respective storage in accordance with various embodiments. In at least one embodiment, each of $UE_{S1(102.1)}$-$UE_{S1(102.2)}$, $UE_{S2(102.1)}$, $UE_{M(102.1)}$-$UE_{M(102.3)}$ and small cell radio 104.2 can also be configured to include at least one transmitter, at least one receiver and at least one antenna. Hence, appropriate software, hardware and/or algorithms are being provisioned for communication system 100 in order to facilitate operations as described for various embodiments discussed herein to facilitate power domain interference coordination in a network environment.

In one example implementation, $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various operations as described for various embodiments discussed herein in a network environment (e.g., for networks such as those illustrated in FIG. 1A). In various embodiments, one or more of $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed herein can include software (or reciprocating software) that can coordinate in order to achieve operations associated with providing power domain interference coordination in a network environment, as outlined herein. In still other embodiments, one or more of $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed herein may include any suitable algorithms, hardware, software, components, modules, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed herein could be provided in any database, register, control list, cache, storage and/or storage structure: all of which can be referenced at any suitable timeframe. Any such storage options may be included within the broad term 'memory element' as used herein. Similarly, any of the potential processing elements, controllers, managers, logic and/or machines described herein should be construed as being encompassed within the broad term 'processor'. Each of $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed herein can also include suitable interfaces for receiving, transmitting, and/or otherwise communicating data or information in a network environment.

Note that in certain example implementations, operations as outlined herein to facilitate power domain interference coordination may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 5A-5D] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 5A-5D] could transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed for various embodiments described herein can couple to one another through simple interfaces (as illustrated) or through any other suitable connection (wired or wireless), which provides a viable pathway for network communications. Additionally, any one or more of $UE_{S1(102.1)}$-$UE_{S1(102.2)}$, $UE_{S2(102.1)}$, $UE_{M(102.1)}$-$UE_{M(102.3)}$, small cell radio 104.1, small cell radio 104.2, macro cell radio 108 and/or central management system 116 discussed herein may be combined or removed from a given deployment based on particular configuration needs. Communications in a network environment are referred to herein as 'messages', 'messaging' and/or 'signaling', which may be inclusive of communications using packets.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   negotiating power domain interference coordination (PDIC) parameters between a macro cell radio and at least one small cell radio, wherein negotiating the PDIC parameters comprises:
   generating macro PDIC parameters for the macro cell radio,
   sending the macro PDIC parameters to the at least one small cell radio, and
   receiving small cell PDIC parameters at the macro cell radio, the small cell PDIC parameters having been generated at the at least one small cell radio;
   determining successive interference cancellation (SIC) parameters based on the negotiated PDIC parameters for each of one or more user equipment (UE) that are to perform SIC for one or more transmissions; and
   sending the SIC parameters to each of the one or more user equipment.

2. The method of claim 1, wherein negotiating PDIC parameters further comprises:

determining, by the macro cell radio, one or more physical resource blocks (PRBs) for which transmission power levels can be coordinated with the at least one small cell radio, wherein the determining is performed for a plurality of frequencies in a frequency domain and a plurality of subframes in a time domain; and determining, for the plurality of frequencies and the plurality of subframes, one or more PRBs for which transmission power levels cannot be coordinated with the at least one small cell radio.

3. The method of claim 2, further comprising:

determining, by the macro cell radio, a maximum modulation and coding scheme (MCS) or an MCS range that can be used for each transmission by the macro cell radio for each of the one or more PRBs for which transmission power levels can be coordinated with the at least one small cell radio;

determining, by the macro cell radio, a maximum transmit power that can be used for each transmission for each of the one or more PRBs for which transmission power levels can be coordinated with the at least one small cell radio;

determining, by the macro cell radio, one or more power ratio(s) to be used for each transmission by the macro cell radio for each of the one or more PRBs for which transmission power levels can be coordinated with the at least one small cell radio;

determining, by the macro cell radio, a first transmission mode that is to be used by the macro cell radio for each transmission for each of the one or more PRBs for which transmission power levels can be coordinated with the at least one small cell radio; and determining, by the macro cell radio, a Multiuser Superposition Transmission (MUST) mode that can be used for the transmissions for each of the one or more PRBs for which transmission power levels can be coordinated with the at least one small cell radio.

4. The method of claim 3, further comprising:

sending the macro PDIC parameters from the macro cell radio to the at least one small cell radio, wherein the macro PDIC parameters comprise:

a first indication for each of the one or more PRBs for which transmission power levels can be coordinated and for which transmission power levels cannot be coordinated with the at least one small cell radio;

a MUST mode indicator;

a macro transmission mode indicator that is to be used by the macro cell radio for each transmission for each of the one or more PRBs for which transmission power levels can be coordinated with the at least one small cell radio;

the maximum MCS or MCS range that can be used for each transmission by the macro cell radio for each of the one or more PRBs for which transmission power levels can be coordinated with the at least one small cell radio;

the maximum transmit power that can be used for each transmission for each of the one or more PRBs for which transmission power levels can be coordinated with the at least one small cell radio; and the one or more power ratio(s) to be used by the macro cell radio for each transmission for each of the one or more PRBs for which transmission power levels can be coordinated with the at least one small cell radio.

5. The method of claim 4, further comprising:

determining, by the macro cell radio, one or more multiuser multiple-input multiple-output (MU-MIMO) parameters, wherein the one or more MU-MIMO parameters comprise at least one of: a number of superposition layers and a precoding matrix indicator; and including the one or more MU-MIMO parameters in the macro PDIC parameters sent to the at least one small cell radio.

6. The method of claim 4, wherein the MUST mode indicator indicates one of:

a Non-Orthogonal Multiple Access (NOMA) mode;

a Semi-Orthogonal Multiple Access (SOMA) mode; and a Rate-adaptive constellation Expansion Multiple Access (REMA) mode.

7. The method of claim 4, further comprising:

determining, by a first small cell radio, one or more PRBs for which transmission power levels can be coordinated with the macro cell radio based, at least in part, on the macro PDIC parameters received from the macro cell radio for the plurality of frequencies and the plurality of subframes;

determining, by the first small cell radio, one or more power ratio(s) to be used by the first small cell radio for each transmission for each of the one or more PRBs for which transmission power levels can be coordinated with the macro cell radio;

determining, by the first small cell radio, a superposition MCS range that is to be used by the first small cell radio for each transmission for each of the one or more PRBs for which transmission power levels can be coordinated with the macro cell radio; and determining, by the first small cell radio, a second transmission mode that is to be used by the first small cell radio for each transmission for each of the one or more PRBs for which transmission power levels can be coordinated with the macro cell radio.

8. The method of claim 7, further comprising:

sending the small cell PDIC parameters from the first small cell radio to the macro cell radio, wherein the small cell PDIC parameters comprise:

a second indication for each of the one or more PRBs for which transmission power levels can be coordinated with the macro cell radio;

the one or more power ratio(s) to be used by the first small cell radio for each transmission for each of the one or more PRBs for which transmission power levels can be coordinated with the macro cell radio;

a small cell transmission mode indicator that is to be used by the first small cell radio for each transmission for each of the one or more PRBs for which transmission power levels can be coordinated with the macro cell radio; and the superposition MCS range that can be used for each transmission by the first small cell radio for each of the one or more PRBs for which transmission power levels can be coordinated with the macro cell radio.

9. The method of claim 8, further comprising:

determining, by the first small cell radio, one or more multiuser multiple-input multiple-output (MU-MIMO) parameters, wherein the one or more MU-MIMO parameters comprise at least one of: a number of superposition layers and a precoding matrix indicator; and including the one or more MU-MIMO parameters in the small cell PDIC parameters sent to the macro cell radio.

10. The method of claim 1, wherein the SIC parameters sent to a particular UE comprise:
- a superposition presence indication;
- a maximum transmit power indication;
- a power ratio indication associated with radio resources to be transmitted to the particular UE;
- a modulation and coding scheme (MCS) indication associated with the radio resources to be transmitted to the particular UE;
- an equivalent MCS due to superposition associated with the radio resources to be transmitted to the particular UE; and
- a transmission mode indicator associated with the radio resources to be transmitted to the particular UE.

11. The method of claim 10, wherein the SIC parameters sent to the particular UE further comprise:
- one or more multiuser multiple-input multiple-output (MU-MIMO) parameters, wherein the one or more MU-MIMO parameters comprise at least one of: a number of superposition layers and a precoding matrix indicator associated with the radio resources to be transmitted to the particular UE.

12. One or more non-transitory tangible media encoding logic that includes instructions for execution that when executed by a processor, is operable to perform operations comprising:
- negotiating power domain interference coordination (PDIC) parameters between a macro cell radio and at least one small cell radio, wherein negotiating the PDIC parameters comprises:
  - generating macro PDIC parameters for the macro cell radio,
  - sending the macro PDIC parameters to the at least on small cell radio, and
  - receiving small cell PDIC parameters at the macro cell radio, the small cell PDIC parameters having been generated at the at least one small cell radio;
- determining successive interference cancellation (SIC) parameters based on the negotiated PDIC parameters for each of one or more user equipment (UE) that are to perform SIC for one or more transmissions; and
- sending the SIC parameters to each of the one or more user equipment.

13. The media of claim 12, wherein negotiating the PDIC parameters further comprises:
- determining, by the macro cell radio, one or more physical resource blocks (PRBs) for which transmission power levels can be coordinated with the at least one small cell radio, wherein the determining is performed for a plurality of frequencies in a frequency domain and a plurality of subframes in a time domain; and
- determining, for the plurality of frequencies and the plurality of subframes, one or more PRBs for which transmission power levels cannot be coordinated with the at least one small cell radio.

14. The media of claim 13, the operations further comprising:
- determining, by the macro cell radio, a maximum modulation and coding scheme (MCS) or an MCS range that can be used for each transmission by the macro cell radio for each of the one or more PRBs for which transmission power levels can be coordinated with the at least one small cell radio;
- determining, by the macro cell radio, a maximum transmit power that can be used for each transmission for each of the one or more PRBs for which transmission power levels can be coordinated with the at least one small cell radio;
- determining, by the macro cell radio, one or more power ratio(s) to be used for each transmission by the macro cell radio for each of the one or more PRBs for which transmission power levels can be coordinated with the at least one small cell radio;
- determining, by the macro cell radio, a first transmission mode that is to be used by the macro cell radio for each transmission for each of the one or more PRBs for which transmission power levels can be coordinated with the at least one small cell radio; and
- determining, by the macro cell radio, a Multiuser Superposition Transmission (MUST) mode that can be used for the transmissions for each of the one or more PRBs for which transmission power levels can be coordinated with the at least one small cell radio.

15. The media of claim 14, the operations further comprising:
- sending the macro PDIC parameters from the macro cell radio to the at least one small cell radio, wherein the macro PDIC parameters comprise:
  - a first indication for each of the one or more PRBs for which transmission power levels can be coordinated and for which transmission power levels cannot be coordinated with the at least one small cell radio;
  - a MUST mode indicator;
  - a macro transmission mode indicator that is to be used by the macro cell radio for each transmission for each of the one or more PRBs for which transmission power levels can be coordinated with the at least one small cell radio;
  - the maximum MCS or MCS range that can be used for each transmission by the macro cell radio for each of the one or more PRBs for which transmission power levels can be coordinated with the at least one small cell radio;
  - the maximum transmit power that can be used for each transmission for each of the one or more PRBs for which transmission power levels can be coordinated with the at least one small cell radio; and
  - the one or more power ratio(s) to be used by the macro cell radio for each transmission for each of the one or more PRBs for which transmission power levels can be coordinated with the at least one small cell radio.

16. The media of claim 15, the operations further comprising:
- determining, by a first small cell radio, one or more PRBs for which transmission power levels can be coordinated with the macro cell radio based, at least in part, on the macro PDIC parameters received from the macro cell radio for the plurality of frequencies and the plurality of subframes;
- determining, by the first small cell radio, one or more power ratio(s) to be used by the first small cell radio for each transmission for each of the one or more PRBs for which transmission power levels can be coordinated with the macro cell radio;
- determining, by the first small cell radio, a superposition MCS range that is to be used by the first small cell radio for each transmission for each of the one or more PRBs for which transmission power levels can be coordinated with the macro cell radio; and
- determining, by the first small cell radio, a second transmission mode that is to be used by the first small cell radio for each transmission for each of the one or more PRBs for which transmission power levels can be coordinated with the macro cell radio.

17. The media of claim 16, the operations further comprising:
  sending the small cell PDIC parameters from the first small cell radio to the macro cell radio, wherein the small cell PDIC parameters comprise:
    a second indication for each of the one or more PRBs for which transmission power levels can be coordinated with the macro cell radio;
    the one or more power ratio(s) to be used by the first small cell radio for each transmission for each of the one or more PRBs for which transmission power levels can be coordinated with the macro cell radio;
    a small cell transmission mode indicator that is to be used by the first small cell radio for each transmission for each of the one or more PRBs for which transmission power levels can be coordinated with the macro cell radio; and
    the superposition MCS range that can be used for each transmission by the first small cell radio for each of the one or more PRBs for which transmission power levels can be coordinated with the macro cell radio.

18. A communication system comprising:
  a macro cell radio comprising at least one first memory element for storing first data and at least one first processor that executes instructions associated with the first data;
  at least one small cell radio comprising at least one second memory element for storing second data and at least one second processor that executes instructions associated with the second data;
  the communication system being adapted when executed by the at least one first processor and the at least one second processor to:
    negotiate power domain interference coordination (PDIC) parameters between the macro cell radio and at least one small cell radio, wherein negotiating the PDIC parameters comprises:
      generating macro PDIC parameters for the macro cell radio,
      sending the macro PDIC parameters to the at least one small cell radio, and
      receiving small cell PDIC parameters at the macro cell radio, the small cell PDIC parameters having been generated at the at least one small cell radio;
    determine successive interference cancellation (SIC) parameters based on the negotiated PDIC parameters for each of one or more user equipment (UE) that are to perform SIC for one or more transmissions; and
    send the SIC parameters to each of the one or more user equipment.

19. The communication system of claim 18, the macro cell radio being further adapted when executed by the at least on first processor to:
  determine one or more physical resource blocks (PRBs) for which transmission power levels can be coordinated with the at least one small cell radio for a plurality of frequencies in a frequency domain and a plurality of subframes in a time domain; and
  determine, for the plurality of frequencies and the plurality of subframes, one or more PRBs for which transmission power levels cannot be coordinated with the at least one small cell radio;
  determine a maximum modulation and coding scheme (MCS) or an MCS range that can be used for each transmission by the macro cell radio for each of the one or more PRBs for which transmission power levels can be coordinated with the at least one small cell radio;
  determine a maximum transmit power that can be used for each transmission for each of the one or more PRBs for which transmission power levels can be coordinated with the at least one small cell radio;
  determine one or more power ratio(s) to be used for each transmission by the macro cell radio for each of the one or more PRBs for which transmission power levels can be coordinated with the at least one small cell radio;
  determine a first transmission mode that is to be used by the macro cell radio for each transmission for each of the one or more PRBs for which transmission power levels can be coordinated with the at least one small cell radio;
  determine a Multiuser Superposition Transmission (MUST) mode that can be used for the transmissions for each of the one or more PRBs for which transmission power levels can be coordinated with the at least one small cell radio; and
  send the macro PDIC parameters from the macro cell radio to the at least one small cell radio.

20. The communication system of claim 19, the small cell radio being further adapted when executed by the at least on second processor to:
  determine one or more PRBs for which transmission power levels can be coordinated with the macro cell radio based, at least in part, on the macro PDIC parameters received from the macro cell radio for the plurality of frequencies and the plurality of subframes;
  determine one or more power ratio(s) to be used by the small cell radio for each transmission for each of the one or more PRBs for which transmission power levels can be coordinated with the macro cell radio;
  determine a superposition MCS range that is to be used by the small cell radio for each transmission for each of the one or more PRBs for which transmission power levels can be coordinated with the macro cell radio;
  determine a second transmission mode that is to be used by the small cell radio for each transmission for each of the one or more PRBs for which transmission power levels can be coordinated with the macro cell radio; and
  send the small cell PDIC parameters from the small cell radio to the macro cell radio.

\* \* \* \* \*

UNITED STATES PATENT AND TRADEMARK OFFICE
CERTIFICATE OF CORRECTION

PATENT NO. : 10,299,223 B2  
APPLICATION NO. : 15/296943  
DATED : May 21, 2019  
INVENTOR(S) : Vivek Jha Page 1 of 1

It is certified that error appears in the above-identified patent and that said Letters Patent is hereby corrected as shown below:

On the Title Page

One page 2, item (56), in Column 2, under "Other Publications", Line 12, delete "EUASIP" and insert -- EURASIP --, therefor.

In the Specification

In Column 4, Line 66, delete "-$UE_{M(102.2)}$" and insert -- -$UE_{M(102.3)}$ --, therefor.

In Column 7, Line 15, delete "$UE_{M(102.1)}$" and insert -- $UE_{M(102.1)}$ --, therefor.

In Column 10, Line 34, delete "-$UE_{S1(102.2)}$," and insert -- -$UE_{S1(102.2)}$. --, therefor.

In Column 32, Line 27, delete "and or" and insert -- and/or --, therefor.

In the Claims

In Column 36, Line 66, in Claim 2, after "negotiating" insert -- the --.

Signed and Sealed this  
Sixth Day of August, 2019

Andrei Iancu  
*Director of the United States Patent and Trademark Office*